(12) United States Patent
Chang et al.

(10) Patent No.: US 11,008,000 B2
(45) Date of Patent: May 18, 2021

(54) RISK PROCESSING FOR VEHICLES HAVING AUTONOMOUS DRIVING CAPABILITIES

(71) Applicant: Motional AD LLC, Boston, MA (US)

(72) Inventors: Hsun-Hsien Chang, Brookline, MA (US); Noam Weinstein, Cambridge, MA (US); Eric Wolff, Cambridge, MA (US); Philipp Robbel, Cambridge, MA (US); Jacob C. Cheuvront, Waltham, MA (US); Karl Iagnemma, Belmont, MA (US); Katarzyna Anna Marczuk, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 16/013,459

(22) Filed: Jun. 20, 2018

(65) Prior Publication Data

US 2018/0362031 A1 Dec. 20, 2018

Related U.S. Application Data

(60) Provisional application No. 62/522,254, filed on Jun. 20, 2017.

(51) Int. Cl.
*B60W 30/09* (2012.01)
*G07C 5/00* (2006.01)
(Continued)

(52) U.S. Cl.
CPC ........ *B60W 30/09* (2013.01); *B60W 30/0953* (2013.01); *B60W 30/0956* (2013.01); *B60W 30/10* (2013.01); *B60W 30/18163* (2013.01); *B60W 50/0097* (2013.01); *G07C 5/008* (2013.01); *B60W 2050/0089* (2013.01);
(Continued)

(58) Field of Classification Search
CPC ..... B60W 2050/0089; B60W 2520/06; B60W 2520/10; B60W 2540/30; B60W 2550/14; B60W 2550/30; B60W 30/09; B60W 30/0953; B60W 30/0956; B60W 30/10; B60W 30/18163; B60W 50/0097; G07C 5/008

See application file for complete search history.

(56) References Cited

U.S. PATENT DOCUMENTS 5,530,651 A * 6/1996 Uemura ................. G01S 15/86
701/301
9,248,834 B1 2/2016 Ferguson et al.
(Continued)

FOREIGN PATENT DOCUMENTS

EP 3141926 3/2017
WO WO 2017079236 5/2017

OTHER PUBLICATIONS

U.S. Appl. No. 15/624,780, Liu et al.
(Continued)

*Primary Examiner* — Babar Sarwar
(74) *Attorney, Agent, or Firm* — Fish & Richardson P.C.

(57) ABSTRACT

Among other things, sensor signals are received using a vehicle comprising an autonomous driving capability. A risk associated with operating the vehicle is identified based on the sensor signals. The autonomous driving capability is modified in response to the risk. The operation of the vehicle is updated based on the modifying of the autonomous capability.

21 Claims, 15 Drawing Sheets

(51) Int. Cl.
*B60W 30/095* (2012.01)
*B60W 30/18* (2012.01)
*B60W 30/10* (2006.01)
*B60W 50/00* (2006.01)

(52) U.S. Cl.
CPC ..... *B60W 2520/06* (2013.01); *B60W 2520/10* (2013.01); *B60W 2540/30* (2013.01); *B60W 2552/00* (2020.02); *B60W 2554/80* (2020.02)

(56) References Cited

U.S. PATENT DOCUMENTS

| | | | | |
|---|---|---|---|---|
| 10,452,068 | B2* | 10/2019 | Djuric | G06N 3/04 |
| 2014/0046585 | A1* | 2/2014 | Morris, IV | G01C 21/3415 |
| | | | | 701/468 |
| 2015/0019043 | A1* | 1/2015 | Creasey | G05D 1/0038 |
| | | | | 701/2 |
| 2016/0070264 | A1* | 3/2016 | Hu | B64C 39/024 |
| | | | | 701/2 |
| 2016/0176397 | A1 | 6/2016 | Prokhorov et al. | |
| 2016/0347310 | A1 | 12/2016 | Moran et al. | |
| 2017/0015318 | A1 | 1/2017 | Scofield et al. | |
| 2017/0148322 | A1* | 5/2017 | Mcgrath | G06K 9/00771 |
| 2018/0107215 | A1* | 4/2018 | Djuric | G06N 3/04 |
| 2018/0322783 | A1* | 11/2018 | Toyoda | G06T 19/006 |
| 2019/0025853 | A1* | 1/2019 | Julian | G06T 7/74 |
| 2019/0332939 | A1* | 10/2019 | Alletto | H04N 19/18 |

OTHER PUBLICATIONS

Florentine et al., "Pedestrian notification methods in autonomous vehicles for multi-class mobility-on-demand service." Proceedings of the Fourth International Conference on Human Agent Interaction, Oct. 4, 2016, pp. 387-392.
Pendleton et al., "Autonomous golf cars for public trial of mobility-on-demand service." Intelligent Robots and Systems (IROS), 2015 IEEE/RSJ International Conference on Sep. 28, 2018, pp. 1164-1171.
International Search Report and Written Opinion in International Application No. PCT/US2018/38520, dated Oct. 22, 2018, 12 pages.
PCT International Preliminary Report on Patentability in International Appln. No. PCT/US2018/38520, dated Jan. 2, 2020, 8 pages.
EP Search Report in European Appln. No. 18820858.1, dated Sep. 21, 2020, 6 pages.

* cited by examiner

RISK PROCESSING FOR VEHICLES HAVING AUTONOMOUS DRIVING CAPABILITIES

CROSS-REFERENCE TO RELATED APPLICATIONS

This application claims priority to and the benefit of U.S. Provisional Application Ser. No. 62/522,254, filed on Jun. 20, 2017, the entire contents of which is incorporated here by reference.

FIELD OF THE INVENTION

This description relates to systems and methods for processing risk for vehicles having autonomous driving capabilities.

BACKGROUND

A vehicle having autonomous driving capabilities may encounter risks while driving on a road. Such risks can involve, for example, a pedestrian suddenly crossing the street in front of the vehicle such that impact with the pedestrian may be difficult to avoid. Such risks can also involve, for example, possibility of collision with another vehicle on the road. Such risks can also involve, for example, possibility of accidents in adverse driving conditions, such as in rain or snow, among others.

SUMMARY

In general, in one aspect, sensor signals are received using a vehicle comprising an autonomous driving capability. A risk associated with operating the vehicle is identified based on the sensor signals. The autonomous driving capability is modified in response to the risk. The operation of the vehicle is updated based on the modifying of the autonomous capability.

Some embodiments of identifying a risk may include detecting or predicting the risk. The identifying may include analyzing the sensor signals, or known or predicted risks, or both. The identifying may include analyzing the sensor signals to determine a position of an object. The identifying may include analyzing the sensor signals to evaluate a speed of an object. The identifying may include analyzing the sensor signals to evaluate speed profiles of two or more objects over time. The identifying may include analyzing the sensor signals to identify a boundary of an object. The identifying may include analyzing the sensor signals to identify overlapping boundaries of two or more objects. The identifying may include analyzing the sensor signals to determine a concentration of a chemical.

In one embodiment, the identifying may include analyzing the sensor signals to segment one or more objects on an image or a video. The identifying may include tracking the segmented one or more objects.

In one embodiment, the identifying may include assessing a threat.

In one embodiment, the identifying may include evaluating a driving behavior of the vehicle or another vehicle. Evaluating a driving behavior may include evaluating a speed, a heading, a trajectory, a vehicular operation, or combinations of these.

In one embodiment, the identifying may include learning a pattern of known risks. The pattern may include associations of the known risks with one or more of objects, times, road configurations, or geolocations.

In one embodiment, updating the operation of the vehicle may include executing a lane change by a motion planning system of the vehicle. Updating the operation of the vehicle may include executing a trajectory change by a motion planning system of the vehicle. Responding to the risk may include treating analyzed sensor signals as prior information to a perception system of the vehicle. Responding to the risk may include invoking intervention on an operation of the vehicle from a remote operator. Updating the operation of the vehicle may include generating and inserting new machine instructions into existing machine instructions of an operation of the vehicle. Responding to the risk may include generating an input to an operation of the vehicle.

In one embodiment, the method may include generating a report of a risk. Generating a report of a risk may include extracting and aggregating information associated with the risk from sensor signals. Extracting and aggregating information may include evaluating one or more of the following: overlapping geographic zones, overlapping time periods, or report frequencies.

In one embodiment, generating a report of a risk may include recording an environment of the risk. Generating a report of a risk may include stitching images or videos to form a view of the risk. Generating a report of the risk may include removing private information associated with the risk. Generating a report of a risk may include providing an interface to allow an interface user to provide information associated with the risk. Generating a report of a risk may include integrating two or more reports associated with the risk.

One embodiment of the method may include receiving a report of a risk from a remote data source.

One embodiment of the method may include assessing a risk factor of the vehicle. Assessing a risk factor may include determining a risk associated with passing through a risky region. Assessing a risk factor may include determining a risk associated with a driving distance or a driving time period. Assessing a risk factor may include determining a risk associated with an aging component of the vehicle. Assessing a risk factor may include determining a risk associated with an inactive autonomous driving capability. Assessing a risk factor may include determining a risk based on a profile of a user of the vehicle. Assessing a risk factor may include determining a risk based on a social network of a user of the vehicle. Assessing a risk factor may include determining a risk associated with a driving behavior. Assessing a risk factor may include determining a risk associated with following traffic rules.

In general, in one aspect, a vehicle having autonomous driving capabilities includes steering, acceleration, and deceleration devices that respond to control signals from a driving control system to drive the vehicle autonomously on a road network. The vehicle also includes a monitoring element on the vehicle that receives sensor signals, and identifies a risk associated with operating the vehicle based on the sensor signals. The vehicle further includes and a controller that responds to the risk by configuring the driving control system to modify the autonomous driving capability in response to the risk and, based on the modifying of the autonomous capability, update an operation of the vehicle to maneuver the vehicle to a goal location.

One embodiment of identifying a risk may include detecting or predicting the risk. The identifying may include analyzing sensor signals, or known or predicted risks, or both. The identifying may include analyzing the sensor signals to determine a position of an object. The identifying may include analyzing the sensor signals to evaluate a speed of an object. The identifying may include analyzing the sensor signals to evaluate speed profiles of two or more objects over time. The identifying may include analyzing the sensor signals to identify a boundary of an object. The identifying may include analyzing the sensor signals to identify overlapping boundaries of two or more objects. The identifying may include analyzing the sensor signals to determine a concentration of a chemical.

In one embodiment of the vehicle, the identifying may include analyzing the sensor signals to segment one or more objects on an image or a video. The identifying may include tracking the segmented one or more objects.

In one embodiment of the vehicle, the identifying may include assessing a threat.

In one embodiment of the vehicle, the identifying may include evaluating a driving behavior of the vehicle or another vehicle. Evaluating a driving behavior may include evaluating a speed, a heading, a trajectory, a vehicular operation, or combinations of them.

In one embodiment of the vehicle, the identifying may include learning a pattern of known risks. The pattern may include associations of the known risks with one or more of objects, times, road configurations, or geolocations.

In one embodiment of the vehicle, updating the operation of the vehicle may include executing a lane change by a motion planning system of the vehicle. Updating the operation of the vehicle may include executing a trajectory change by a motion planning system of the vehicle. Responding to the risk may include treating analyzed sensor signals as prior information to a perception system of the vehicle. Responding to the risk may include invoking intervention on an operation of the vehicle from a remote operator. Updating the operation of the vehicle may include generating and inserting new machine instructions into existing machine instructions of an operation of the vehicle. Responding to the risk may include generating an input to an operation of the vehicle.

In one embodiment, the vehicle may include a reporting element to generate a report of a risk. Generating a report of a risk may include extracting and aggregating information associated with the risk from sensor signals. Extracting and aggregating information may include evaluating one or more of the following: overlapping geographic zones, overlapping time periods, or report frequencies.

In one embodiment of the vehicle, generating a report of a risk may include recording an environment of the risk. Generating a report of a risk may include stitching images or videos to form a view of the risk. Generating a report of the risk may include removing private information associated with the risk. Generating a report of a risk may include providing an interface to allow an interface user to provide information associated with the risk. Generating a report of a risk may include integrating two or more reports associated with the risk.

In one embodiment of the vehicle, the reporting element may include receiving a report of a risk from a remote data source.

One embodiment of the vehicle may include assessing a risk factor of the vehicle. Assessing a risk factor may include determining a risk associated with passing through a risky region. Assessing a risk factor may include determining a risk associated with a driving distance or a driving time period. Assessing a risk factor may include determining a risk associated with an aging component of the vehicle. Assessing a risk factor may include determining a risk associated with an inactive autonomous driving capability. Assessing a risk factor may include determining a risk based on a profile of a user of the vehicle. Assessing a risk factor may include determining a risk based on a social network of a user of the vehicle. Assessing a risk factor may include determining a risk associated with a driving behavior. Assessing a risk factor may include determining a risk associated with following traffic rules.

In general, in one aspect, an apparatus includes a processor configured to process data to identify a risk of driving a vehicle comprising an autonomous driving capability. The processor is also configured to modify the autonomous driving capability in response to the risk, and update operation of the vehicle based on the modifying of the autonomous capability. The apparatus also includes an alarm configured to issue an alert of the identified risk.

In one embodiment of the apparatus, identifying a risk may include detecting or predicting the risk. The data may include sensor signals, or known or predicted risks, or both. The identifying may include analyzing the sensor signals to determine a position of an object. The identifying may include analyzing the sensor signals to evaluate a speed of an object. The identifying may include analyzing the sensor signals to evaluate speed profiles of two or more objects over time. The identifying may include analyzing the sensor signals to identify a boundary of an object. The identifying may include analyzing the sensor signals to identify overlapping boundaries of two or more objects. The identifying may include analyzing the sensor signals to determine a concentration of a chemical.

In one embodiment of the apparatus, the identifying may include analyzing the sensor signals to segment one or more objects on an image or a video. The identifying may include tracking the segmented one or more objects.

In one embodiment of the apparatus, the identifying may include assessing a threat.

In one embodiment of the apparatus, the identifying may include evaluating a driving behavior of the vehicle or another vehicle. Evaluating a driving behavior may include evaluating a speed, a heading, a trajectory, a vehicular operation, or combinations of them.

In one embodiment of the apparatus, the identifying may include learning a pattern of known risks. The pattern may include associations of the known risks with one or more of objects, times, road configurations, or geolocations.

In one embodiment of the apparatus, updating the operation of the vehicle may include executing a lane change by a motion planning system of the vehicle. Updating the operation of the vehicle may include executing a trajectory change by a motion planning system of the vehicle. Responding to the risk may include treating analyzed sensor signals as prior information to a perception system of the vehicle. Responding to the risk may include invoking intervention on an operation of the vehicle from a remote operator. Updating the operation of the vehicle may include generating and inserting new machine instructions into existing machine instructions of an operation of the vehicle. Responding to the risk may include generating an input to an operation of the vehicle.

In one embodiment, the apparatus may include a processor configured to generate a report of a risk. Generating a report of a risk may include extracting and aggregating information associated with the risk from sensor signals. Extracting and aggregating information may include evaluating one or more of the following: overlapping geographic zones, overlapping time periods, or report frequencies.

In one embodiment of the apparatus, generating a report of a risk may include recording an environment of the risk. Generating a report of a risk may include stitching images or videos to form a view of the risk. Generating a report of the risk may include removing private information associated with the risk. Generating a report of a risk may include providing an interface to allow an interface user to provide information associated with the risk. Generating a report of a risk may include integrating two or more reports associated with the risk.

In one embodiment of the apparatus, the processor may include a processor configured to receive a report of a risk from a remote data source.

One embodiment of the apparatus may include a processor configured to assess a risk factor of the vehicle. Assessing a risk factor may include determining a risk associated with passing through a risky region. Assessing a risk factor may include determining a risk associated with a driving distance or a driving time period. Assessing a risk factor may include determining a risk associated with an aging component of the vehicle. Assessing a risk factor may include determining a risk associated with an inactive autonomous driving capability. Assessing a risk factor may include determining a risk based on a profile of a user of the vehicle. Assessing a risk factor may include determining a risk based on a social network of a user of the vehicle. Assessing a risk factor may include determining a risk associated with a driving behavior. Assessing a risk factor may include determining a risk associated with following traffic rules.

These and other aspects, features, and embodiments can be expressed as methods, apparatus, systems, components, program products, methods of doing business, means or steps for performing a function, and in other ways.

These and other aspects, features, and embodiments will become apparent from the following descriptions, including the claims.

DETAILED DESCRIPTION

Figure 1:
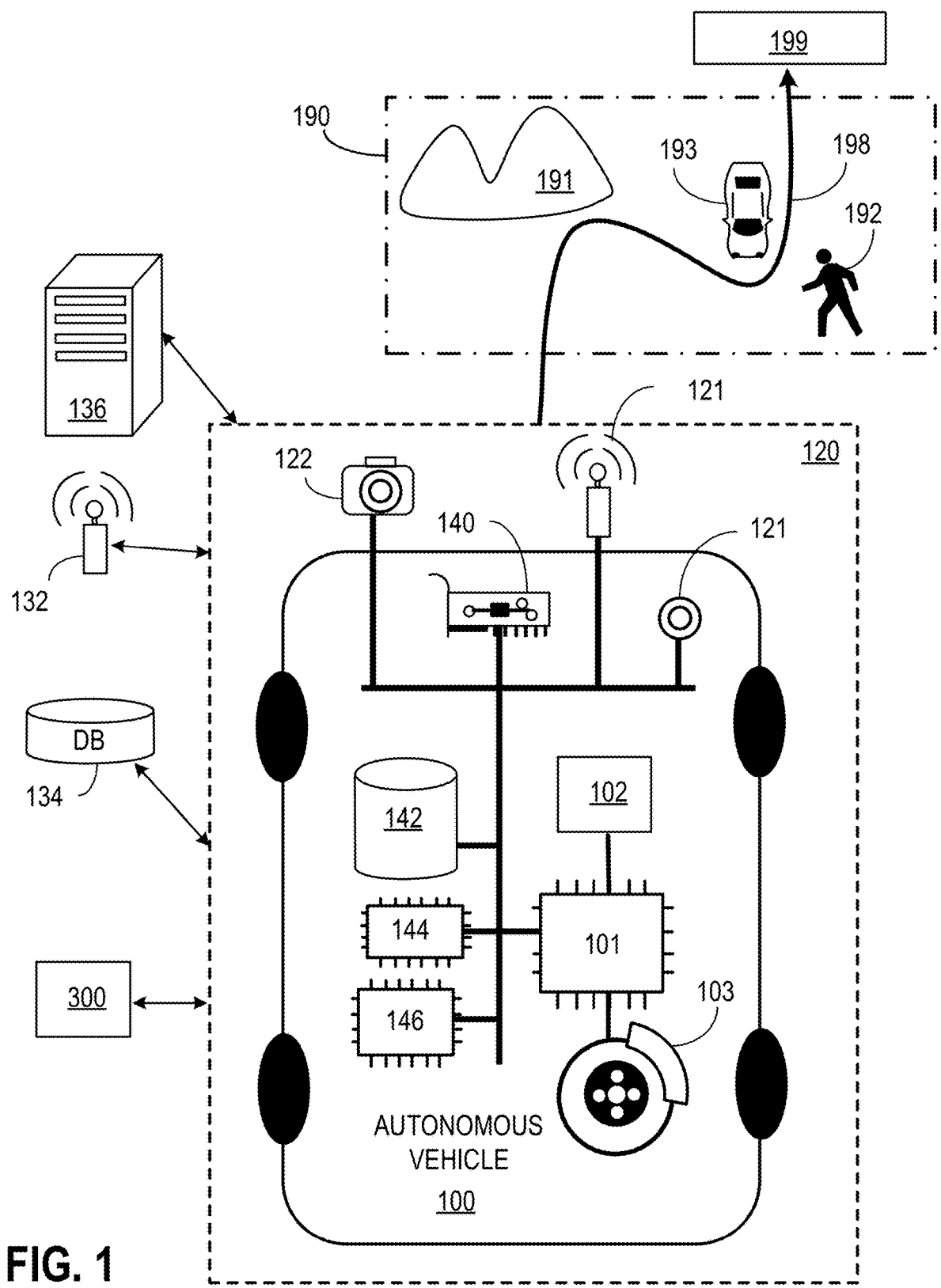
FIG. 1 illustrates an example of an autonomous vehicle having autonomous capability.

FIG. 1 illustrates an example of an autonomous vehicle 100 having autonomous capability.

As used herein, the term "autonomous capability" refers to a function, feature, or facility that enables a vehicle to be operated without real-time human intervention, unless specifically requested by the vehicle.

As used herein, an autonomous vehicle (AV) is a vehicle that possesses autonomous capability.

As used herein, vehicle includes means of transposition of goods or people. For example, vehicles can be cars, buses, trains, airplanes, drones, trucks, boats, ships, submersibles, dirigibles, among others. A driverless car is an example of an AV.

As used herein, the term "trajectory" refers to a path or route generated by an AV to navigate from a first spatio-temporal location to second spatio-temporal location. In an embodiment, the first spatio-temporal location is referred to as the initial or starting location and the second spatio-temporal location is referred to as the goal or goal-position. In an embodiment, the spatio-temporal locations correspond to real world locations. For example, the spatio-temporal locations include pickup or drop off locations to pick up or drop off persons or goods.

As used herein, the term "risk processing" refers to accumulating information about a risk, predicting a risk, monitoring a risk, analyzing a risk, reacting to a risk, assessing factors associated with a risk, or any combination of the above.

As used herein, the term "risk processing system" refers to any kind of hardware, software, firmware, computer, or device of any kind, or a combination of two or more of them, that performs risk processing.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system may be spread across several locations. For example, some of the software of the AV system may be implemented on a cloud computing environment similar to cloud computing environment 1300 described below with respect to FIG. 13.

In general, this document describes technologies applicable to any vehicles that have one or more autonomous capabilities including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). Vehicles with Autonomous Capabilities may attempt to control the steering or speed of the vehicles. The technologies descried in this document also can be applied to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). One or more of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

In the following description, headings are provided for improved readability. Although headings are provided, information related to a particular heading but not found in the section having that heading, may also be found elsewhere in the specification.

Referring to FIG. 1, an AV system 120 operates the AV 100 autonomously or semi-autonomously along a trajectory 198 through an environment 190 to a goal location 199 while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 1304 described below in reference to FIG. 13. Examples of devices 101 include a steering control 102, brakes 103, gears, accelerator pedal, windshield wipers, side-door locks, window controls, and turn-indicators.

In an embodiment, the AV system 120 includes sensors 121 for measuring or inferring properties of state or condition of the AV 100, such as the AV's position, linear and angular velocity and acceleration, and heading (e.g., an orientation of the leading end of AV 100). For example, GPS, inertial measurement units (IMU) that measure both vehicle linear accelerations and angular rates, wheel speed sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, radar, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 1308 or storage device 1310 described below in relation to FIG. 13. In an embodiment, memory 144 is similar to the main memory 1306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in some embodiments, one or more other types of communication) is sometimes referred to as Vehicle-to-Everything (V2X) communication. V2X communication typically conforms to one or more communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 1200 as described in FIG. 12. The communication interfaces 140 transmit data collected from sensors 121 or other data related to the operation of AV 100 to the remotely located database 134. In an embodiment, communication interfaces 140 transmit information that relates to teleoperations to the AV 100. In some embodiments, the AV 100 communicates with other remote (e.g., "cloud") servers 136.

In an embodiment, the remotely located database 134 also stores and transmits digital data (e.g., storing data such as road and street locations). Such data may be stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. Such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 may include computer peripherals 132 coupled to computing devices 146 for providing information and alerts to, and receiving input from, a user (e.g., an occupant or a remote user) of the AV 100. In an embodiment, peripherals 132 are similar to the display 1312, input device 1314, and curser controller 1316 discussed below in reference to FIG. 13. The coupling may be wireless or wired. Any two or more of the interface devices may be integrated into a single device.

Figure 2:
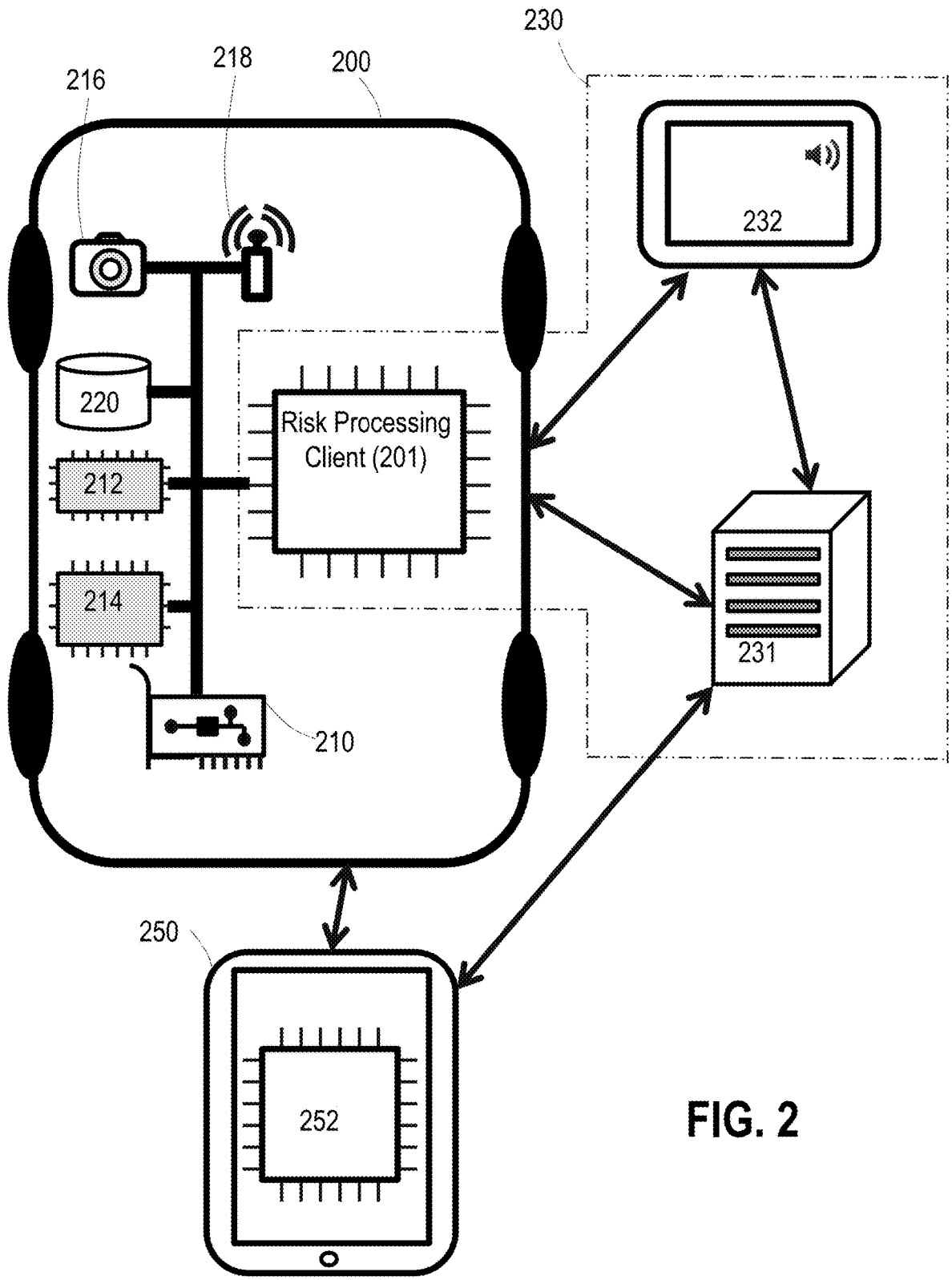
FIGS. 2-4 illustrate examples of architectures of risk processing systems.
Figure 3:
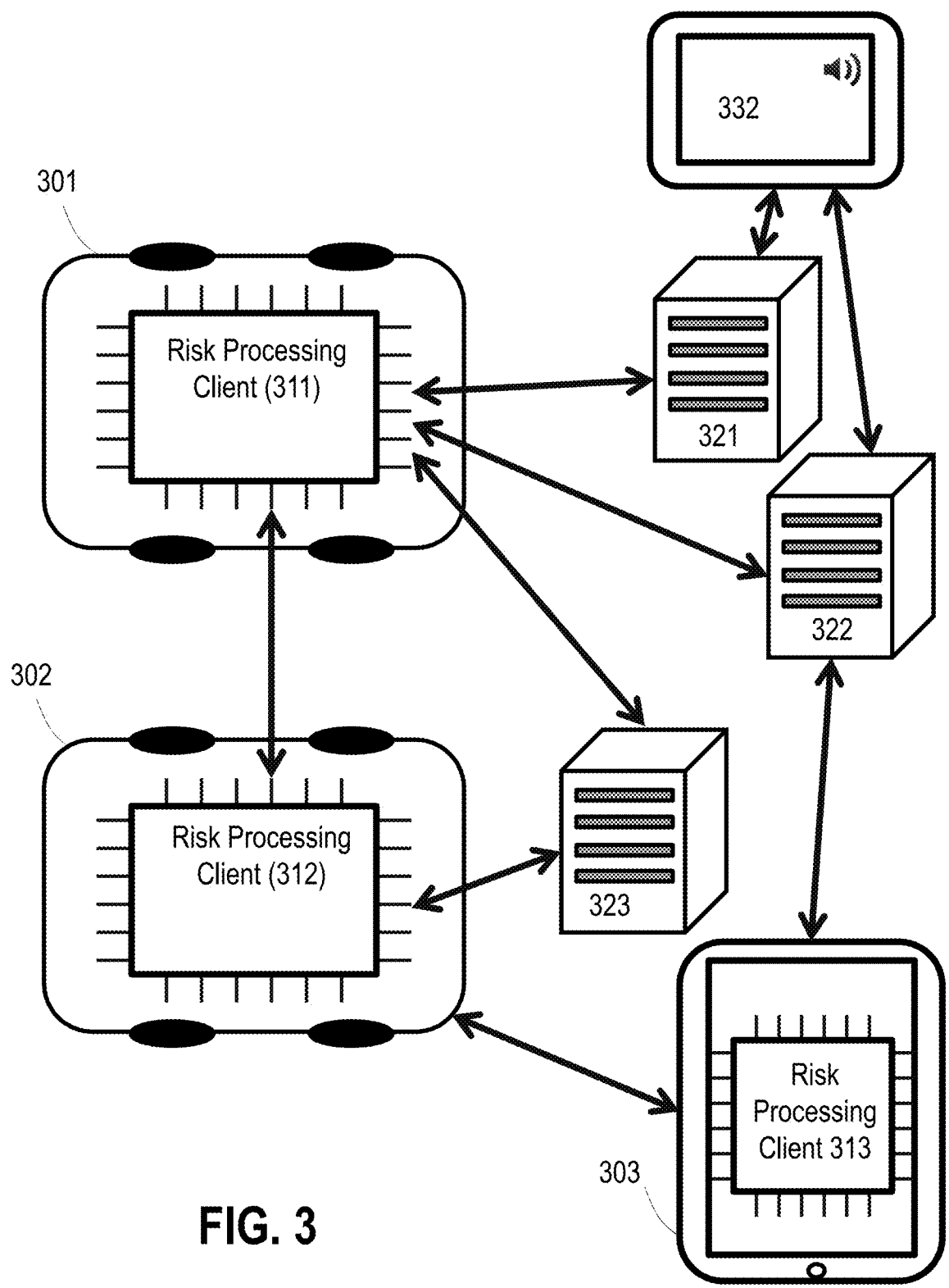
Figure 4:
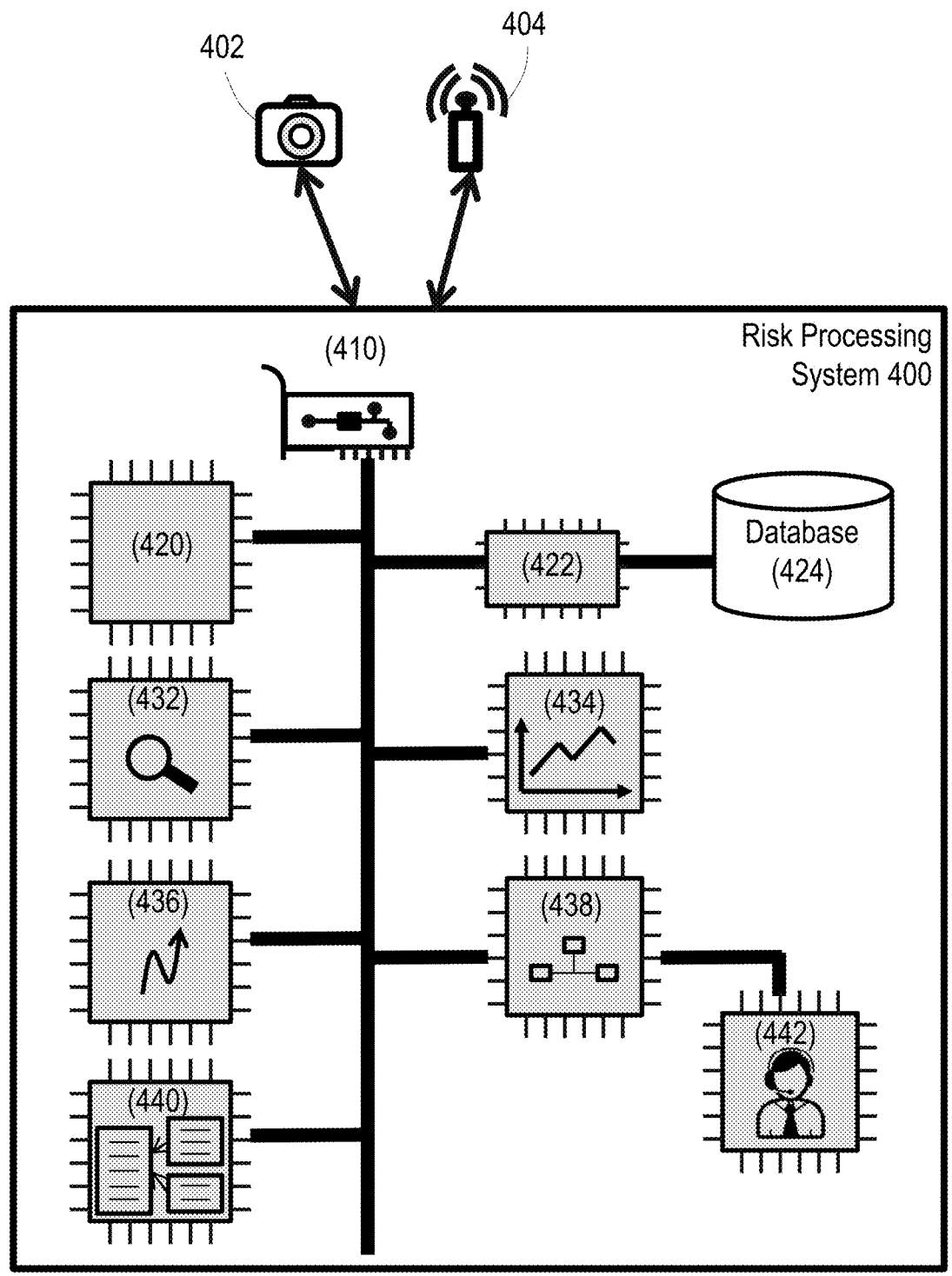

FIGS. 2-4 illustrate examples of architectures of risk processing systems. Referring to FIG. 2, a risk processing system 230 includes the following elements:

A risk processing client 201, realized by integrated circuits, field-programmable gate arrays, hardware, software, or firmware, or a combination of two or more of the above.

In one embodiment, the risk processing client 201 is installed on the AV system 200. The risk processing client 201 may interact with components of the AV system 200 (e.g., sensors 216 and 218, communication devices 210, user interface devices, memory 212, a processor 214, a database 220, or functional devices, or combinations of them). For example, the risk processing client 201 sends and receives information and commands. The risk processing client 201 communicates via a communication device 210 (that may be at least partly wireless) with a risk processing server 231. In one embodiment, the communication device 210 is a communication interface.

In one embodiment, the risk processing client 252 is installed on a mobile device 250. The risk processing client 252 may utilize signals collected by the sensors of the mobile device 250, such as GPS sensors, cameras, accelerometers, gyroscopes, and barometers. The risk processing client 252 can communicate with a risk processing server 231 over a communication interface of the mobile phone 250.

In one embodiment, the risk processing client 201 may be installed on a combination of the AV system (in particular on the AV itself) and a mobile device 250.

A risk processing server 231 is on board the AV of the AV system 200 or in a remote location, for example, at least 0.1, 1, 2, 3, 4, 5, 10, 20, 30, 40, 50, 100, 200, 300, 400, 500, 600, 700, 900, or 1000 meters away from the AV of the AV system 200.

A graphical user interface 232 may be presented by the risk processing client 201, or the risk processing server 231, or both. Embodiments may present on the interface 232 information of one or more of the following: risk factors, a known risk, an active risk, a present risk, a potential risk, a road network, a condition of the AV of the AV system 200, an environment of the AV of the AV system 200, or sensor signals, among other things.

Referring to FIG. 3, in one embodiment, a risk processing client 311 may communicate with two or more risk processing servers 321, 322 and 323. In some cases, two or more servers (e.g., 321 and 322) receive and aggregate information for risk processing or for presentation on an interface 332. In one embodiment, a server (e.g., 323) may receive risk information from two or more risk processing clients 311 and 312, which are installed, for example, on different AV systems 301 and 302, respectively. One embodiment allow a server (e.g., 322) to receive risk information from two or more risk processing clients 311 and 313, which are installed on an AV system 301 and a mobile device 303, respectively.

In one embodiment, a risk processing client (e.g., 312) is configured as a server to receive and aggregate information from one or more other risk processing clients (e.g., 311 or 313, or both). In one embodiment, a risk processing client (e.g., 312) may play a role as a relaying device for establishing and maintaining a communication between a server 323 and another client 311.

Referring to FIG. 4, a risk processing system 400 may communicate with one or more sensors (e.g., 402 and 404) to collect signals via a communication interface 410. Sensor signals or existing data or both may be stored in memory 422 or a database 424 or both.

A database 424 may be onboard or remote to, or both, the AV. The database 424 may store data from sensors, government agencies, police stations, or insurance companies, or combinations of them. Examples of the data stored in the database 424 include timestamps, time windows, peak traffic, weather, maps, street light settings, traffic sign settings, traffic lights settings, road configurations, addresses, normal vehicle operator behaviors, abnormal vehicle operator behaviors, normal AV operations, abnormal AV operations, traffic due to social events, traffic due to sport events, location of hospitals, location of police stations, location of fire stations, known risks along a trajectory, predicted risks along a trajectory, characteristics (for example, age, gender, ethnicity, or socio-economic status) of individuals involved in high risk situations along a trajectory, characteristics (for example, color, make, model, or engine type) of vehicles involved in high risk situations along a trajectory, value of insurance claims filed/processed for high risk situations along a trajectory, cost of repairs associated with high risk situations along a trajectory, and cost/characteristics of insurance policies offered to protect against high risk situations along a trajectory.

Processing and analyzing the signals and data may be realized by a processor 420, or a computing resource of the processor 420.

In one embodiment, a risk processing system includes a risk monitoring process 432 to predict potential risks or detect existing risks in the environment of the AV system.

In one embodiment, a risk processing system includes a risk reporting process 434 to report predicted or detected risks.

In one embodiment, a risk processing system includes a risk reaction process 436 to configure the AV system to take suitable actions when a risk is predicted or detected. In one embodiment, the risk reaction process 436 includes or communicates with a teleoperation system 442 to allow a remote operator to operate AV 502 in response to a risk.

In one embodiment, a risk processing system includes a risk factor assessing process 438 to evaluate risk factors affecting the on-road operation of AV 502.

In one embodiment, a risk processing system includes a report integration process 440 to integrate two or more risk reports.

Risk Monitoring

Among other things, a risk monitoring process identifies risks by monitoring an environment near the AV, an operation of the AV system, or the interior of the AV.

Figure 5:
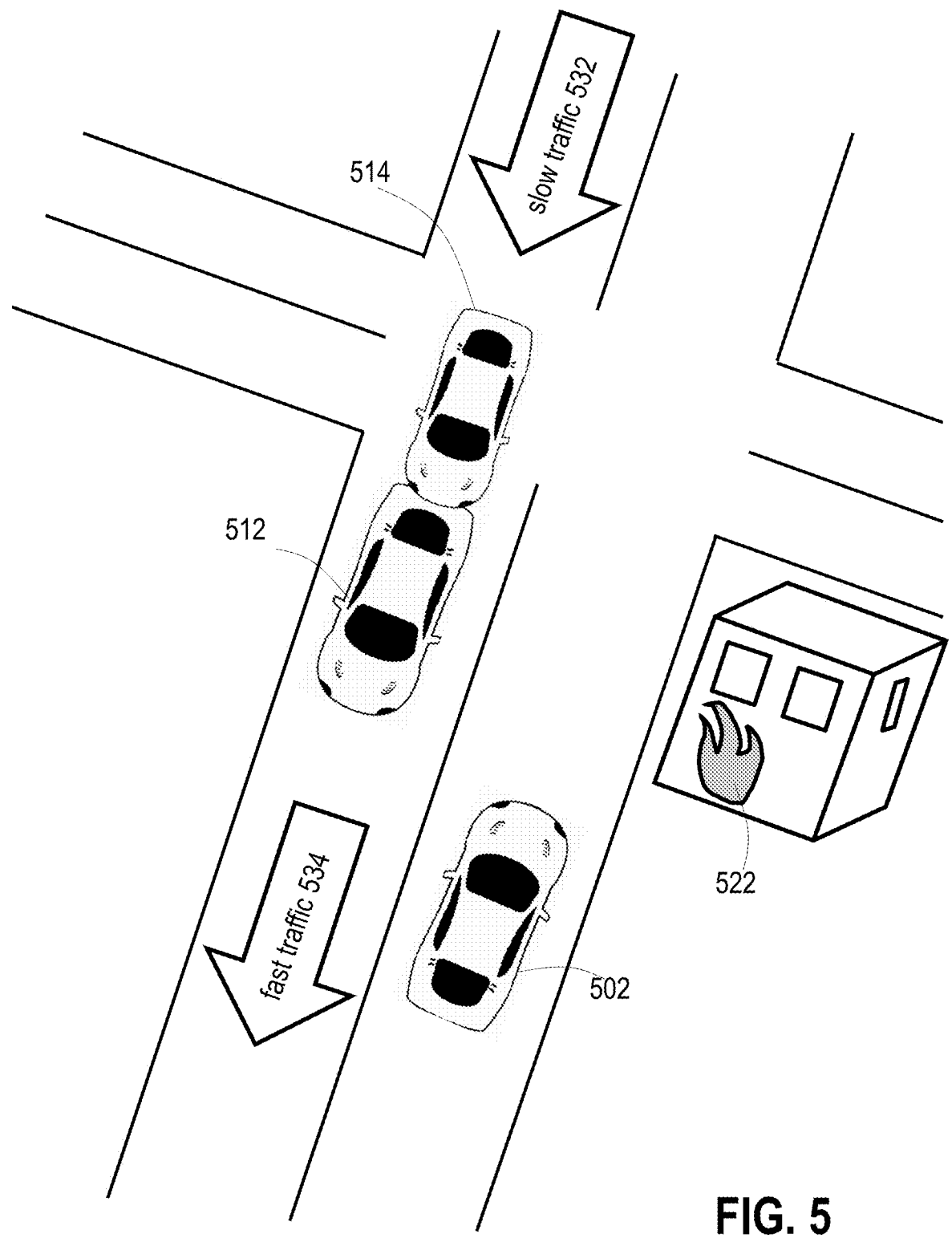
FIG. 5 illustrates an example of an autonomous vehicle detecting a collision in its vicinity while driving on a road.

Collisions. FIG. 5 illustrates an example of an autonomous vehicle AV 502 detecting a collision in its vicinity while driving on a road. For instance, upon analyzing signals from sensors (e.g., a vision sensor, a lidar or a radar, or combinations of them) AV 502 produces information about other objects (e.g., vehicles 512 and 514, infrastructure, and pedestrians) in the environment; examples of such information include: locations, speeds, orientations, boundaries, sizes, dimensions, status of traffic lights (for example, red, green, amber, malfunction, etc.), information related to manufacturers, plate numbers, owners, drivers, and operational state of other vehicles on the road along with AV 502. The information is analyzed by risk processing server to predict a potential collision or detect an existing collision.

In one embodiment, a sensor (e.g., lidar) may emit a wave beam (e.g., an electromagnetic beam, or an acoustic beam, or both) and a component of the beam may return after hitting an object. A returning beam component can indicate a boundary point of the object. When a sensor emits a scan comprising Mbeams each of which produces N returning beam components, a cloud of M×N points (also called a point cloud) is acquired.

Figure 6A:
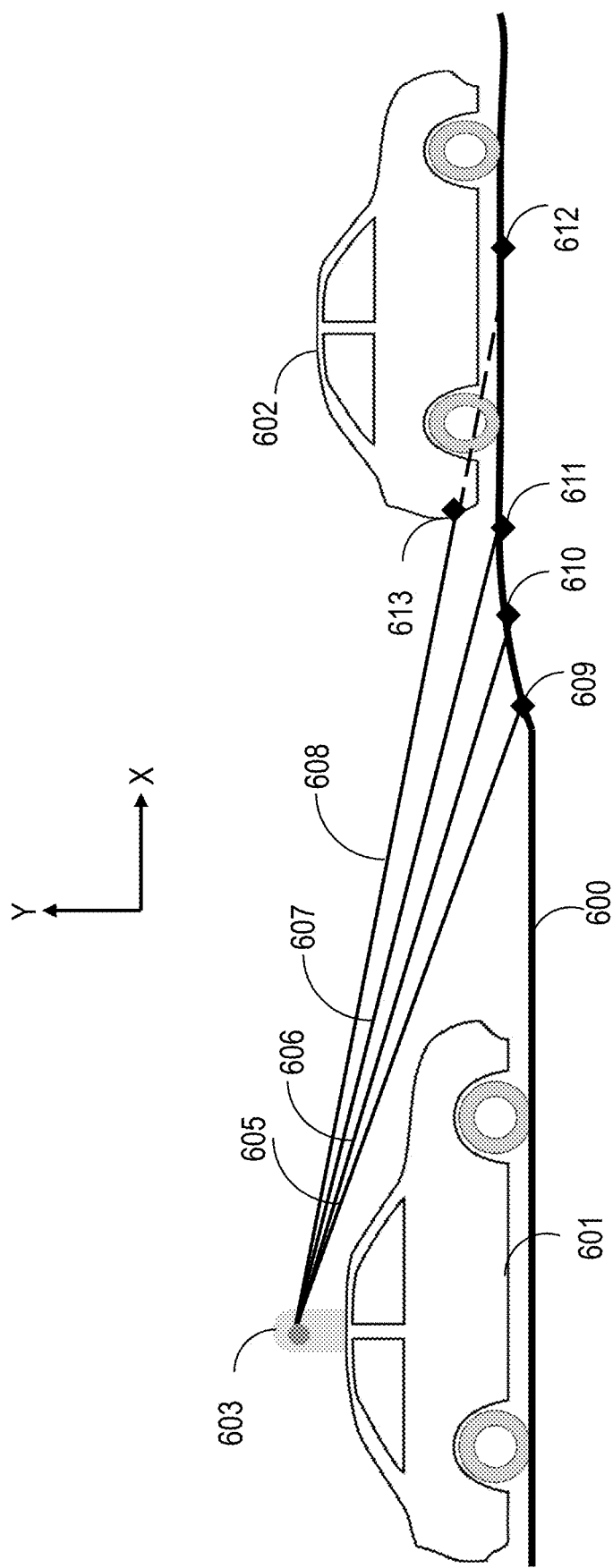
FIG. 6A illustrates an example of object detection by an autonomous vehicle by encoding information about an elevation profile of the road surface.

Analyzing a map from a database or images from a vision sensor, or both, can further determine foreground and background. FIG. 6A illustrates an example of object detection by an autonomous vehicle AV system 601 by encoding information about an elevation profile of the road surface. As shown in FIG. 6A, a map used by the AV system 601 may encode information about an elevation profile of the road surface 600. This information can be used to classify a given point as belonging to the road surface as follows. In one embodiment, an image, including depth information, from a vision sensor (e.g., a stereo camera) is acquired and segmentation is applied to identify a background region, or a foreground object, or both. Segmentation results may be used alone or be integrated with map information (e.g., projected onto a map) for classifying points in a point cloud.

Given information about the current position and orientation of the AV system 601 and the position of the sensor 603, the AV system 601 derives a point (e.g., 609, 610, 611 or 612) at which an emitted beam (e.g., 605, 606, 607, or 608) is expected to encounter the ground. If a point (613) returned by a beam (608) is closer to the AV 601 than the expected point (612) by a predefined difference, then the beam is determined to have encountered an object 602 (e.g., a point on the foreground), and the point 613 is classified as a boundary point of the object 602. In one embodiment, machine learning (for example, deep learning) is used to perform foreground classification. Such an approach fuses data from multiple sensors (such as lidar, radar and camera) to improve the classification accuracy.

When an object's boundary is detected, the risk monitoring process tracks the boundary and determine a speed of the object. In one embodiment, a speed sensor (e.g., based on radar) is employed to determine the object's speed. Referring to FIG. 5, based on measured speeds of vehicles 512 and 514 at a time t, the risk monitoring process can predict their positions and boundary locations at time t+1. When the boundaries of objects 512 and 514 at time t+1 overlap, a collision is predicted. In some cases, when a risk monitoring process detects that the boundaries of objects 512 and 514 overlap and the speeds of the objects drop swiftly to zero, a collision is detected.

In one embodiment, the AV system 502 may use sensor signals (e.g., lidar, radar, images, GPS, or information in vehicle-to-vehicle signals, or combinations of them) to determine the locations of the objects 512 and 514, and detect a collision that occurred before the AV 502 arrives in the vicinity of the collision between the objects 512 and 514. In one embodiment, the AV system 502 may use sensor signals to determine shapes or boundaries or sizes or dimensions, or combinations of them, of the objects 512 and 514, and infer the collision based on overlapping between the objects. For instance, segmentation on an image may identify locations and boundaries of the objects 512 and 514.

In one embodiment, the AV system 502 may use traffic information (e.g., traffic volume and flow) to infer a collision. The AV system 502 may measure the traffic flow to determine if the traffic flow is in an abnormal condition. For instance, objects 512 and 514 involved in a collision have zero speed, and the traffic 532 behind the objects 512 and 514 is slow or congested, but the traffic 534 in front of the objects 512 and 514 is faster.

Risky substances. By analyzing signals from sensors (e.g., a smoke sensor, a chemical sensor, a temperature sensor, a flame sensor, a fire sensor, a radioactivity sensor, or combinations of them) the risk monitoring process may detect a fire, flame 522, smoke, or radioactivity in the environment of the AV 502.

For example, the risk monitoring process may include one or more sensors (e.g., chemical sensors, radar, vision sensors, optical sensors, and infrared sensors) or may have access to signals of the sensors. Sensor signals may provide information about the chemical composition of the AV's environment, such as a concentration of a certain chemical species or combinations of them (e.g., carbon monoxide, carbon dioxide, composition C, sulfides, explosives, and toxic chemicals). In some cases, sensor signals may provide information about a shape of a risky object (e.g., gun, bomb, and grenade).

The risk monitoring process analyzes sensor signals based on a pattern recognition algorithm to predict or detect presence of a risky substance, or a source of a risky substance, or both. For instance, when a fire (e.g., 522 in FIG. 5) exists, the air in the environment may contain substances whose concentrations deviate from normal values, and the risk monitoring process may compute a likelihood of the presence of the fire 522. In some cases, the AV system may analyze distributions of the risky substances in a space over time to determine a source of a risk; for example, concentrations near the source are higher than those in a distant location. In some applications, the risk monitoring process may monitor an interior of the AV to detect presence of risky substances, such as explosives, combustibles, poisonous gases, and flammables. For example, the AV may detect increased concentration of carbon dioxide due to the AV being located in an enclosed area.

Threat assessment. The risk monitoring process analyzes sensor signals and data to assess threats. For example, the risk monitoring process detects an abnormal concentration of a chemical (e.g., an alcohol level, a toxic substance, and an explosive material) that is possessed by an AV occupant or possessed by an approaching object (e.g., a person or an occupant of a vehicle).

Figure 6B:
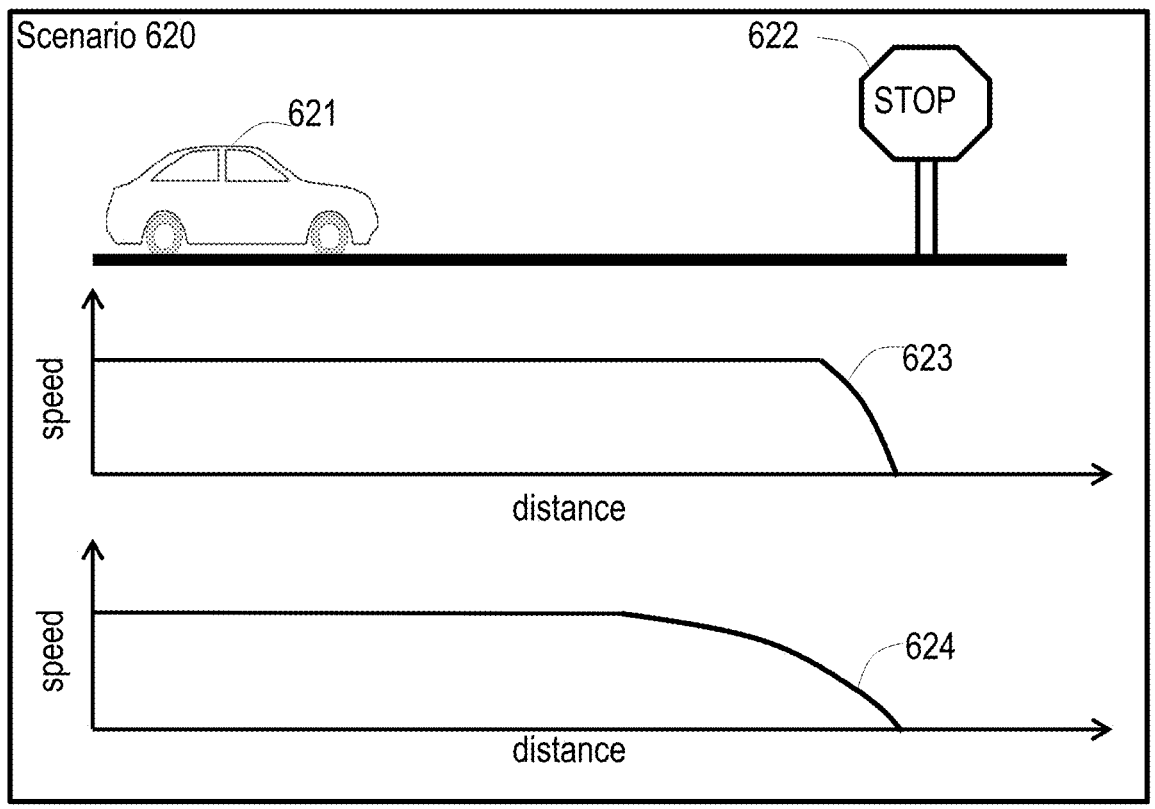
FIGS. 6B and 6C illustrate examples of a risk monitoring process monitoring driving behaviors.
Figure 6B:
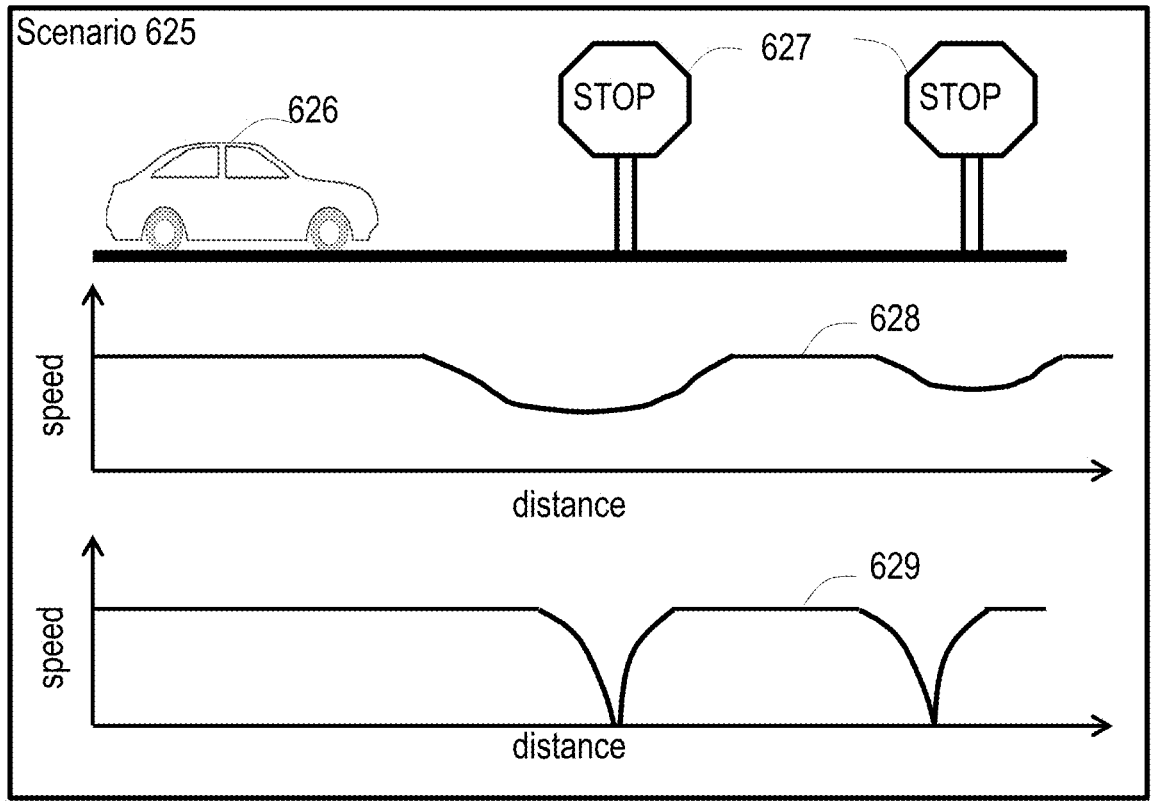
Figure 6C:
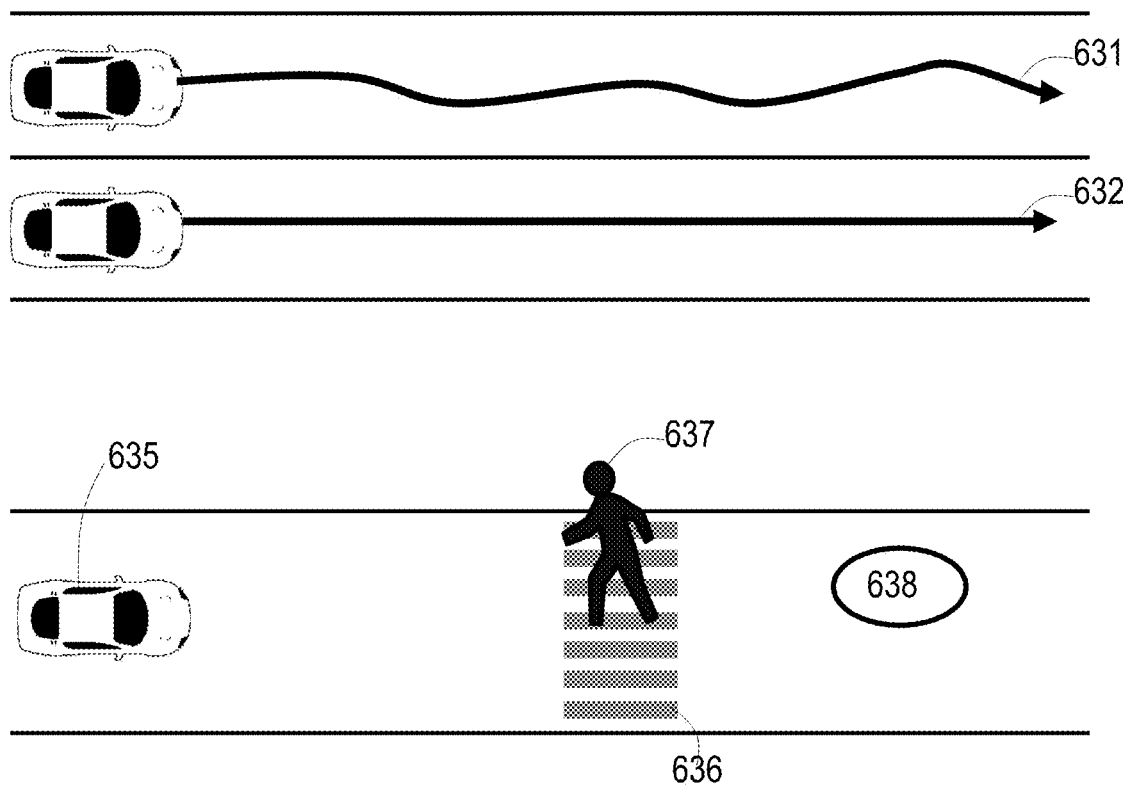

Vehicle Operation Characteristics. In an embodiment, the risk monitoring process evaluates a driving behavior of a vehicle possessing an autonomous driving capability. FIGS. 6B-6C illustrate examples of a risk monitoring process monitoring driving behaviors.

The risk monitoring process monitors whether a vehicle follows traffic rules. For instance, referring to scenario 620 in FIG. 6B, the risk monitoring process monitors driving behavior of a vehicle 621 when encountering a stop sign 622. Driving behavior 623 involves slowing down when nearly arriving the stop sign 622, but second driving behavior 624 involves gradually slowing down within a reasonable distance from the stop sign 622. Thus, driving behavior 623 is riskier than second driving behavior 624.

In another scenario 625 in FIG. 6B, the risk monitoring process monitors driving behavior of a vehicle 626 when encountering stop signs 627. Third driving behavior 628 has a smoother speed profile than fourth driving behavior 629, so the driving behavior 628 makes the occupant of the vehicle feel more comfortable than the fourth driving behavior 629. In this context, a speed profile is a plot of the variation in speed of a vehicle over a period of time. A jagged speed profile with several peaks and valleys is an indicator of haphazard starts and stops and consequently unsafe or rough driving. Different driving behaviors are weighted and balanced against one another. For example, the third driving behavior 628 also does not make a full stop at the stop signs, so the third driving behavior 628 is riskier than the fourth driving behavior 629.

Referring to FIG. 6C, the risk monitoring process monitors headings or driving trajectories of vehicles. For instance, when driving on a straight road segment, fifth driving behavior 631 involving a vehicle wiggling is riskier than sixth driving behavior 632 involving the vehicle maintaining a straight trajectory.

In one embodiment, the risk monitoring process monitors how a vehicle reacts to dynamic objects on the road. For example, referring to FIG. 6C, the risk monitoring process determines how the vehicle 635 slows down when approaching a crossing 636, when encountering a pedestrian 637, or when detecting an object 638.

The risk monitoring process evaluates driving behaviors based on analyzing sensor signals. For example, the risk monitoring process uses a speed sensor (e.g., based on radar) to monitor speeds. In one embodiment, the risk monitoring process uses a position sensor (e.g., based on GPS) to monitor a position, or a series of positions. In some cases, the risk monitoring process uses odometer onboard a vehicle to monitor a driving distance. In some cases, the risk monitoring process includes a sensor onboard a vehicle to monitor the operations of the steering wheel, the brake pedal, the acceleration, or the deceleration, or combinations of the above. In an embodiment, a vehicle utilizes in-vehicle cameras to monitor vehicle operational characteristics associated with the operator of a vehicle. For example, the vehicle may analyze operator attentiveness and wakefulness by monitoring operator's eyes, pupil dilation, or alcohol consumption by analyzing operator breath.

The risk monitoring process evaluates driving behaviors based on comparing a driving behavior with a template driving behavior. In one embodiment, a template driving behavior includes driving based on: traffic rules, preferred driving behaviors, driving behaviors of human drivers, a statistical summary of human drivers, driving behaviors of AV systems, or a statistical summary of AV systems. In one embodiment, a template driving behavior includes two vehicles from a same manufacturer or different manufacturers. In one embodiment, a template driving behavior includes two AV systems from a same provider or different providers.

Database exploration. In an embodiment, the risk monitoring process explores a database of past risks or statistics of risks, or both. For example, the database may be hosted by government agencies, police departments, or insurance companies, or combinations of them.

In one embodiment, the risk monitoring process learns patterns of risks. For example, a learning algorithm may infer one or more of (or combinations of) the following: regions with frequent disasters, regions with frequent collisions, regions with frequent drunk drivers, regions with frequent sports events, regions with frequent protests, drivers with bad driving behaviors, frequent types of risks in a region, and frequent causes of risks in a region, among others.

In some cases, the patterns include time period information, e.g., peaks, mornings, afternoons, evenings, nights, weekdays, and weekends. In some cases, the patterns include road configurations, e.g., parallel parking streets, crosswalks, 4-way stops, 3-way stops, highways, bifurcations, merges, dedicated lanes, and bicycle lanes. In some cases, the patterns include distributions of risks within a region or within a time period; for example, more collisions take place at the center of the intersection of a 4-way stop and fewer collisions take place away from the center.

In one embodiment, the patterns include a dynamic model to describe the risks. For example, a probabilistic model (e.g., Gaussian distributions or Poisson distributions) may be used to describe risks on a road configuration, within a region, or within a time period, or combinations of them.

The learned patterns are used as prior information for the AV system to configure driving behaviors of the AV on a road. For example, when the AV is approaching a region having frequent risks, the AV slows down when passing the region, or it plans a trajectory to avoid passing the region or a combination of the two. In some applications, when approaching a region having frequent risks involving one or more specific types of objects (e.g., children, bicycles, trucks, pedestrians, or animals), a perception process of the AV system is dedicated to detecting these specific types of objects. For example, prior probabilities of the presence of these specific types of objects may become high in the perception process. In one embodiment, the patterns include a model describing risks associated with trajectory information; for example, a database may show that a right turn at an intersection frequently is associated with accidents, and a model may describe the right-turn and the corresponding probability of collisions.

Risk Reporting

In an embodiment, a risk reporting process automatically reports a potential risk or an existing risk. An entity receiving a report may include a risk processing provider, a transportation service provider, a government agency, a fire station, a police station, a health service provider, an insurance company, an auto manufacturer, or a road user, or combinations of them.

The potential risk or the existing risk is determined automatically from a risk monitoring process. A report of a risk includes snapshot or temporal signals from sensors, such as images, radar signals, lidar signals, GPS signals, or speed signals, or combinations of them. A report of a risk includes information associated with the risk, such as timestamps, maps, traffic volumes, traffic flows, street light setting, travel signal settings, road configurations, addresses, hospitals, parties involved in the risk, injured parties involved in the risk, or object features (e.g., types, colors, sizes, shapes, models, make, plate numbers, VINs or owners, or combinations of them).

In an embodiment, the risk reporting process includes processing received signals to extract information associated with the risk. For example, given an image or a video, the risk reporting process may segment the objects involved in the risk, identify the parties (e.g., based on plate numbers, or on information embedded in V2V or V2I communications, or on both) involved in the high risk situation, or recognize traffic configurations (e.g., volumes, speeds, traffic lanes, traffic lights, traffic signs, and infrastructure), or combinations of them. In one embodiment, the risk reporting process identifies a geolocation where a signal is taken; the geolocation information may be embedded in the signal or be inferred based on one or more GPS signals in the vicinity of the risk.

When receiving information about a risk from a risk monitoring process, the risk reporting process may evaluate if the same risk has been previously or simultaneously reported. In some cases, in addition to the prediction or detection performed by the risk monitoring process of the AV system, the risk may be predicted or detected by another source (e.g., another AV system) or be notified by another source (e.g., a risk processing server, a government agency's server, or a news provider, or combinations of them). To determine if the risk has been reported and if the risk is real, the risk reporting process may evaluate one or more of the following factors.

Figure 7:
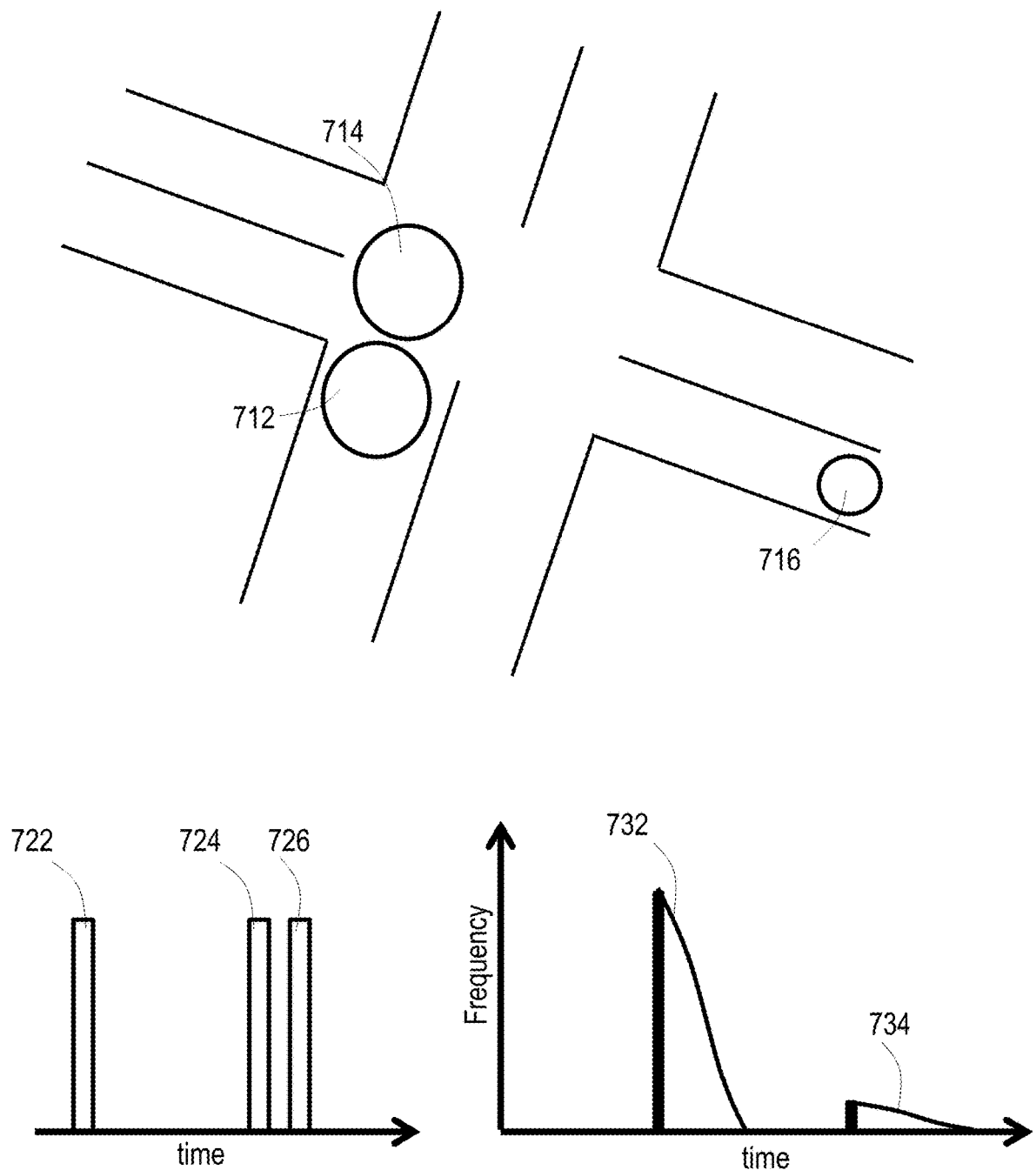
FIGS. 7-10 illustrate examples of a risk processing system.

1. Geographic zones. Referring to FIG. 7, the risk reporting process defines a zone of a risk. When two zones (e.g., 712 and 714) are close to one another, their associated risks may be identical or similar. In contrast, when a zone (e.g., 716) is far away from another zone, it may involve a dissimilar or different risk.
2. Time. Referring to FIG. 7, the risk reporting process records a timestamp for a time at which a high risk situation was identified. When two timestamps (e.g., 724 and 726) are close in time, their associated risks may be identical or similar. In contrast, when there is a gap between two timestamps, the associated risks may involve a dissimilar or different risk.
3. Report frequency. Referring to FIG. 7, the risk reporting process may record reported events. When a large number of reports is associated with a risk 732, the deduced risk 732 exists; otherwise, for a risk 734 with a small number of reports, the detection of risk may be a false positive. In one embodiment, a geolocation is taken into account. For example, the number of reports of a risk in an area with a high population density (e.g., a metropolitan area) is expected to be higher than in an area with a low population density (e.g., a rural area).

Figure 8:
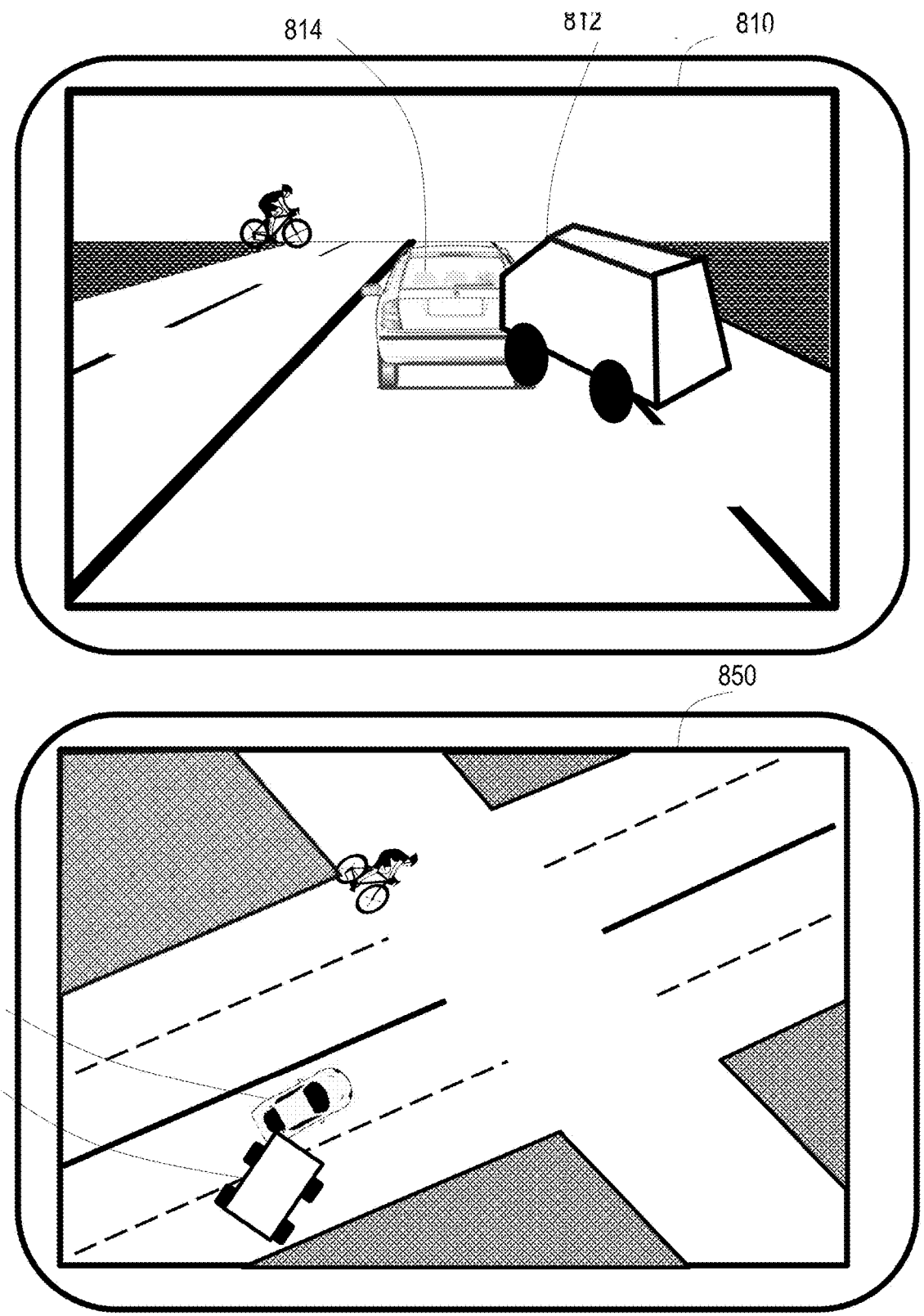

In one embodiment, the risk reporting process includes an interface to allow a user to report a risk. Referring to FIG. 8, a risk reporting process provides a user with an interface 810, for example, to submit one or more images or videos about a risk (e.g., a collision between objects 812 and 814). In some cases, a risk reporting process provides a user with an interface 850 to report a risk on a map (e.g., a collision between objects 852 and 854). In some applications, the risk reporting process allows the interface user to provide (e.g., by clicking, typing, or speaking, or combinations of them) one or more of the following: a location of a risk, parties involved in a risk, locations of the parties, event details, road conditions, weather conditions, or traffic configurations (e.g., volumes, speeds, traffic lanes, traffic lights, traffic signs, and infrastructure).

In one embodiment, the risk reporting process processes a report to comply with laws, regulations, or policies, or combinations of them. For example, the risk reporting process may remove private information (e.g., social security number and driver license number) associated with a risk before transmitting the report to a third party.

Report Integration

In one embodiment, a report integration process (440 in FIG. 4) synthesizes two or more risk reports into an integrated risk report. When two or more risk reports are made, each may include partial information about a single risk. For example, one report may include a time and a location of the risk, and another may include a time, a location, a road configuration, and a travel signal. In one embodiment, the report integration process resolves the discrepancy between the reported times, or between the reported locations, or both, and then generates a report associated with the risk with one or more of the following: a single timestamp or a single time period, a single location or a region, a road configuration, and a travel signal.

Figure 9:
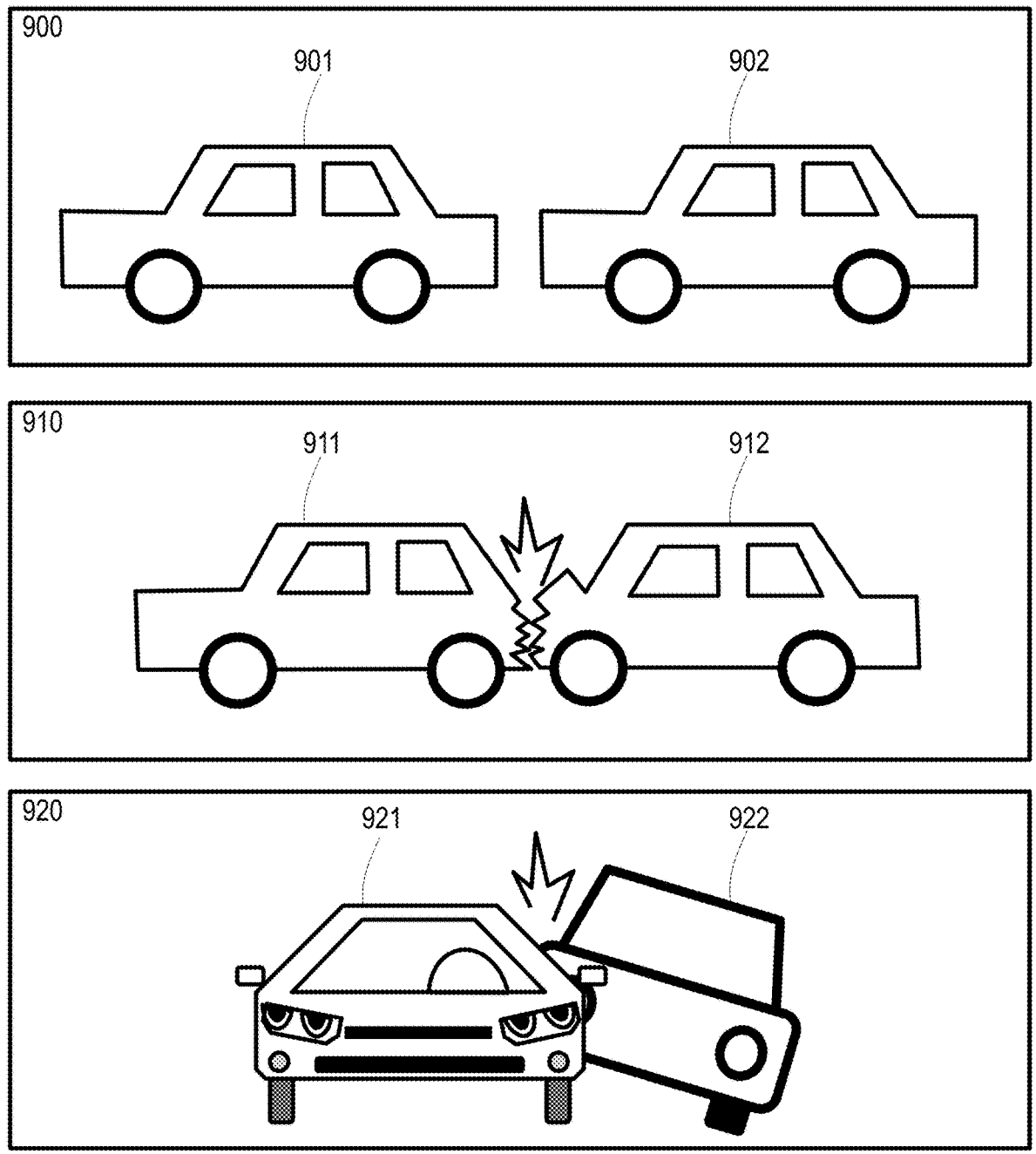

In one embodiment, a report integration process stitches two or more sensor signals. For example, referring to FIG. 9, one report may include images or videos recording a collision from a side view with scenes 900 and 910. The two vehicles 901 and 902 in scene 900 collide and become collided vehicles 911 and 912 in scene 910. Another report may include images or videos from a front view showing a scene 920 of collided vehicles 921 and 922, which reveals that the collision was caused by the vehicle 922 (corresponding to the vehicle 902 in scene 900) attempting to pass the vehicle 921 (corresponding to the vehicle 901 in scene 900). The two different reports associated with the same collision may reveal different information. Thus, the report integration process may utilize image processing and computer vision to stitch data from different reports. In some applications, the report integration process reconstructs a view of a risk in a two-dimensional or three-dimensional space. The report integration process may further reconstruct the view over time to show how the risk was evolving.

In one embodiment, a report integration process provides a user interface to allow a user to verify a report of a risk or an aggregated report of one or more risks.

Risk Reaction

In one embodiment, a risk reaction process (436 in FIG. 4) configures the AV system in response to an existing risk or a potential risk.

The AV system receives a notice of a risk from one of the following: a risk monitoring process, a risk reporting process, a risk processing server, another AV system, an object on the road, or an infrastructure, or combinations of the above. In one embodiment, an existing or potential risk is stored in a database (e.g., map data). For example, map data may annotate a previously reported risk, a known existing risk, a known future risk, a collision-prone zone, a construction, and a heavy traffic zone.

In one embodiment, the risk reaction process adapts a motion planning process of the AV system based on one or more risks. For example, when a risk is near the AV, a motion planning process may plan a lane-changing trajectory to bypass the risk. In contrast, when a risk is far away, a motion planning process may plan a trajectory to its goal position by choosing another route to circumvent the risk.

In one embodiment, the risk reaction process enhances or alters a perception process of the AV system. When the AV is expected to pass near a risk, the information about the risk is assigned a higher priority for the perception process. For example, referring to FIG. 9, in an embodiment, the perception process recognizes objects (e.g., 901 and 902) in their normal conditions. However, when the two objects collide, the perception process may fail to recognize the two collided objects (e.g., 911 and 912), because the collided objects 911 and 912 have deformed shapes or the perception process may misclassify the collided objects 911 and 912 as a single unknown object. In such cases, the risk reaction process configures the perception process to consider the risk information as prior information C and to use probabilistic inference $p(S|C)$ to correctly recognize the collided objects (5) in the environment of the AV.

In one embodiment, the risk reaction process triggers a teleoperation system (442 in FIG. 4) for a tele-operator to guide the driving of the AV. For example, when a risk is observed and the AV is unable to drive along a previously planned trajectory, the risk reaction process sends a request to the tele-operation system. An intervention on the driving of the AV may be invoked based on the tele-operation system. Additional information about such tele-operation is found in U.S. patent application Ser. No. 15/624,780, filed Jun. 16, 2017, which is incorporated here by reference.

In one embodiment, the way the risk reaction process changes or adapts another process is based on a flag. For instance, when a risk is predicted or detected, the flag is turned from inactive (e.g., represented by 0) to active (e.g., represented by 1), so the other process will retrieve or listen to outputs from the risk reaction process.

Figure 10:
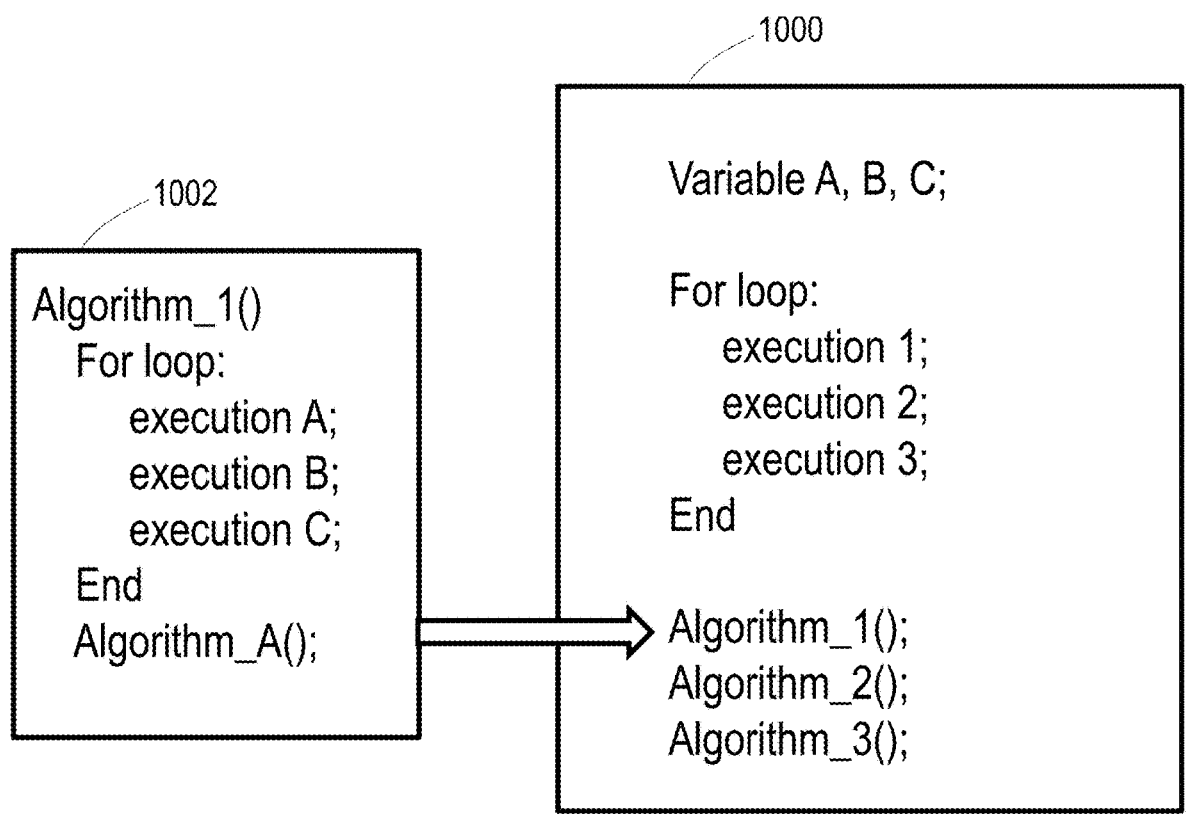
Figure 10:
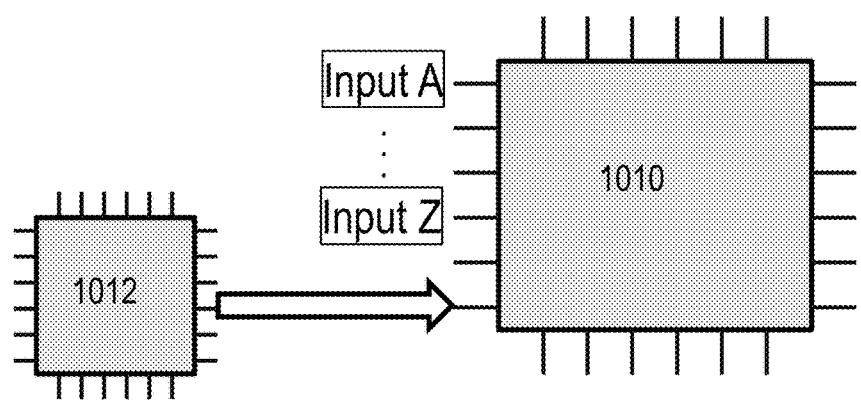

In one embodiment, the way the risk reaction process alters another underlying process is based on programming code. For example, referring to FIG. 10, in an embodiment, the underlying process 1000 executes routine instructions. When the AV system is aware of a risk, the risk reaction process 1002 dynamically generates a set of instructions that can be inserted into the executions of the underlying process 1000. In some cases, the underlying process 1010 takes one or more inputs (e.g., detected objects in the environment of the AV system), and an output of the reaction process 1012 is treated as an input (e.g., an additional stationary object blocking the current trajectory of the AV system) to the underlying process 1010.

Figure 11:
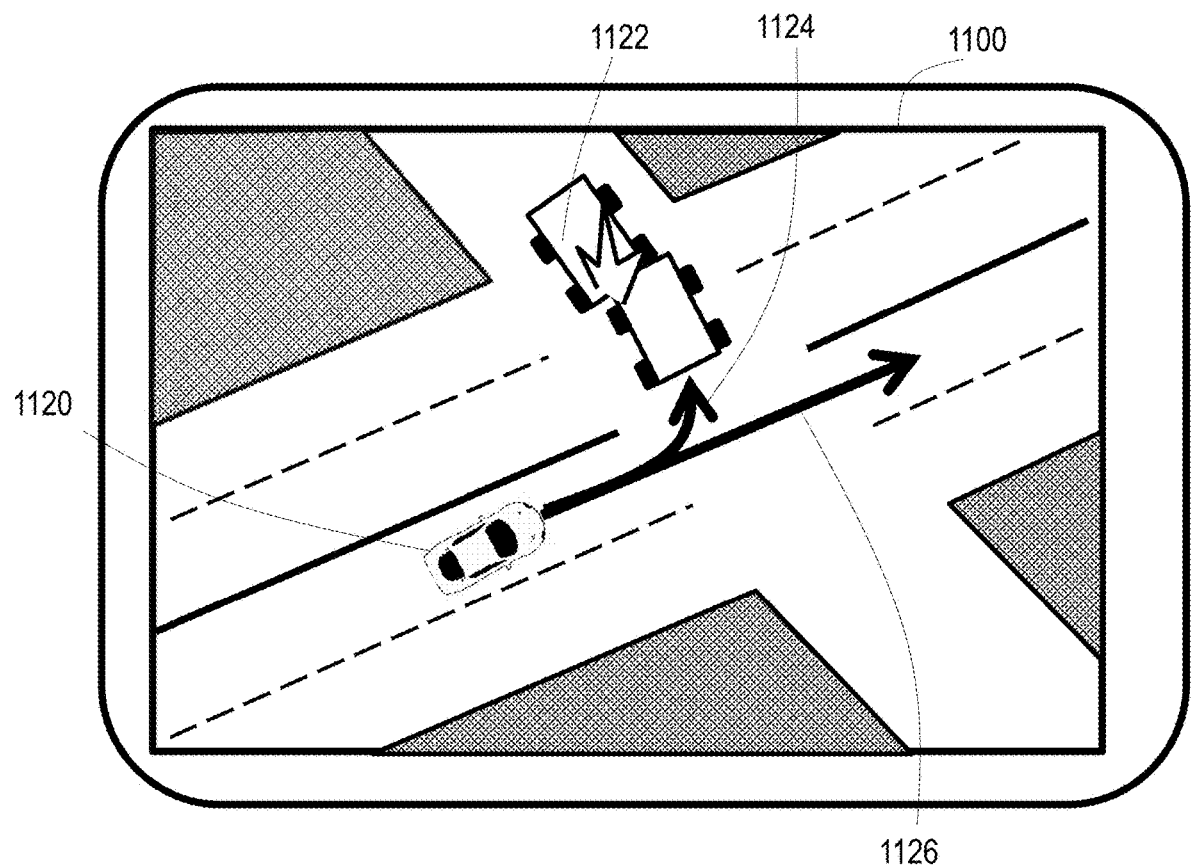
FIG. 11 illustrates an example of an interface of a risk processing system.

In one embodiment, the risk reaction process generates an alarm of a potential risk or an existing risk; the alarm is based on visual or audio signals. The reactions to be taken or recommended by the risk reaction process is provided via visual or audio signals. FIG. 11 illustrates an example of an interface 1100 of a risk processing system. In an embodiment, the interface 1100 presents a detected risk (e.g., collision 1122) detected near the AV 1120. In some cases, the interface generates an audio signal (e.g., a sound, or a spoken language, or both) to provide alert for the risk 1122. The risk reaction process also may change a previous navigation guidance for a left-turn trajectory 1124 for the AV 1120 to a new navigation guidance for a straight trajectory 1126. The change in trajectory may be presented on the interface 1100, or verbally described by the interface 1100, or both.

Risk Factor Assessment

In one embodiment, a risk factor assessing process calculates existing or potential risk factors of the AV system. The risk factor assessment may be used to compute insurance premiums. For example, in one embodiment, the risk factor assessing process evaluates the number of miles to be traversed for a trajectory. A larger number of miles may imply a higher risk.

In one embodiment, the risk factor assessing process evaluates the number of miles to be traveled during a time period. A larger number of miles may imply a higher risk.

In one embodiment, a risk is not physically external to the AV. In some cases, the risk factor assessing process evaluates a health condition of the AV. For example, components of the AV (e.g., tires, brakes, engines, steering wheels, accessory belt tension pulleys, accessory belt tensioners, camshaft position sensors, crankshaft position sensors, crankshaft pulleys, crankshaft seals, cylinder heads, engine gasket sets, harmonic balancers, knock sensors, motor and transmission mounts, motor and transmission mount brackets, oil cooler hoses, oil dipsticks, oil drain plug gasket, oil filters, oil level sensors, oil pans, oil pan gaskets, oil pressure switches, oil pumps, rod bearing sets, timing belts, timing belt kits, timing belt tensioners, valve cover, valve cover gaskets, valve stem seals, perception sensors, perception process, motion planning process, databases, and computing processors) that have aged or have been used heavily may imply a higher risk.

In one embodiment, the risk factor assessing process evaluates if a risk processing system is active when driving the AV. An inactive (e.g., due to malfunctioning or deactivation by the vehicle operator) risk processing system may imply a higher risk.

In one embodiment, the risk factor assessing process evaluates if an anti-theft system (e.g., alarms and sensors) is active when driving the AV system. An inactive (e.g., due to due to malfunctioning or deactivation by the vehicle operator) anti-theft system may imply a higher risk.

In one embodiment, the risk factor assessing process evaluates if a trajectory of the AV is through a risky region. Passing through a risky region may imply a higher risk.

In one embodiment, the risk factor assessing process evaluates a user's profile. A user may be an occupant of the AV, or a party using the AV for transporting someone else or something else. Examples of a user profile include age, occupation, driving history, driving behaviors, driving purpose, active driving license, a frequency of using vehicles, income level and history, education level and history, and home address, among others.

In one embodiment, the risk factor assessing process evaluates a user's social network profile. For example, in some cases, the risk processing system connects to the user's social network accounts (e.g., Facebook, LinkedIn, Instagram, YouTube, and personal website) to evaluate red flags for the user. A user having, or being prone to, for example, a psychiatric disorder, a terroristic tendency, or abnormal use of weapons, or combinations of these, may imply a higher risk.

In one embodiment, the risk factor assessing process evaluates a driving behavior. For example, a driving behavior deviating from a normal behavior may imply a higher risk. As another example, a driving behavior violating a traffic rule may imply a higher risk. As another example, a driving behavior inducing a less comfort level may imply a higher risk.

Figure 12:
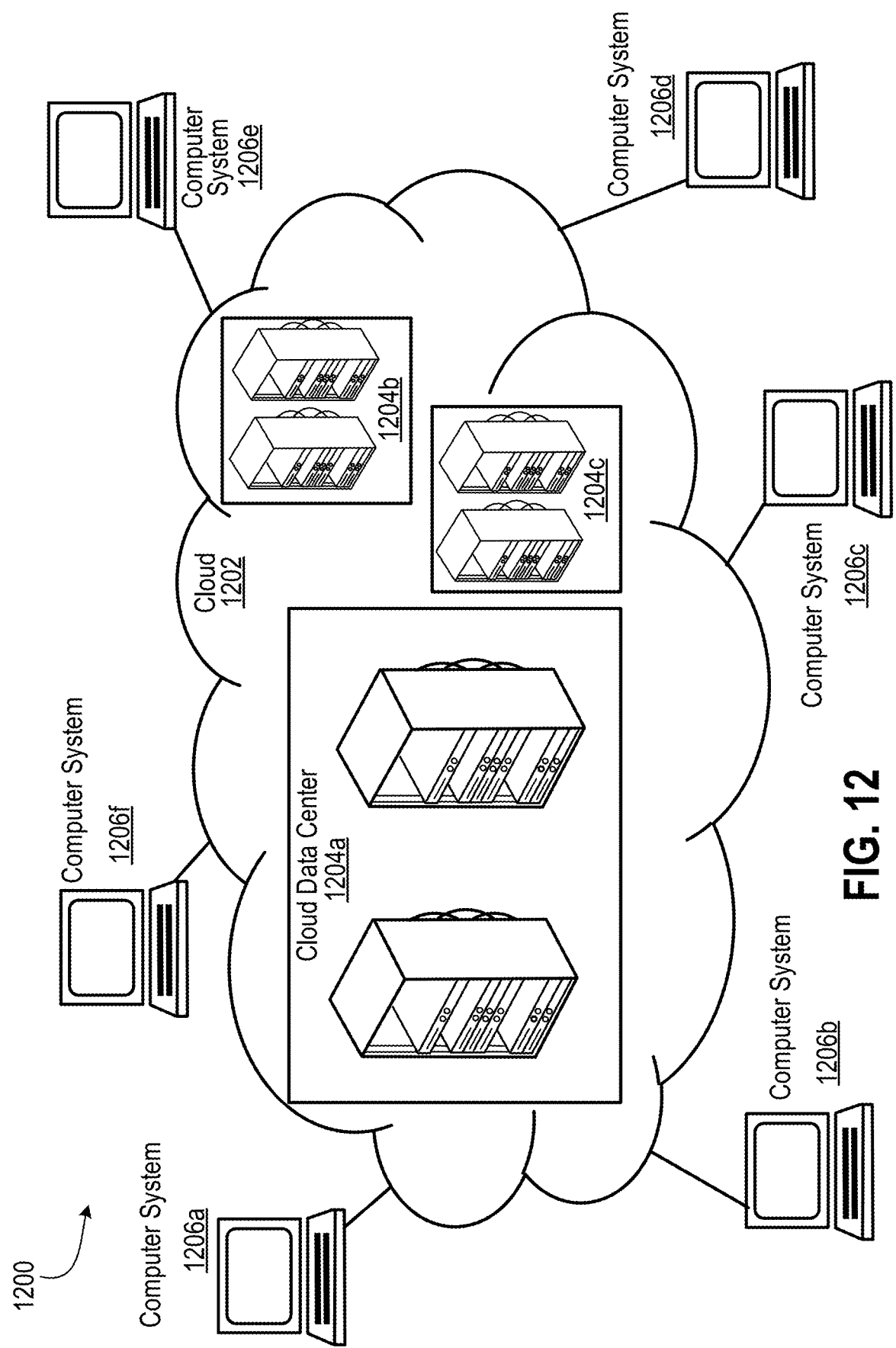
FIG. 12 illustrates an exemplary "cloud" computing environment.

FIG. 12 illustrates an exemplary "cloud" computing environment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, one or more large cloud data centers house the machines used to deliver the services provided by the cloud. Referring now to FIG. 12, the cloud computing environment 1200 includes cloud data centers 1204a, 1204b, and 1204c that are interconnected through the cloud 1202. Data centers 1204a, 1204b, and 1204c provide cloud computing services to computer systems 1206a, 1206b, 1206c, 1206d, 1206e, and 1206f connected to cloud 1202.

The cloud computing environment 1200 includes one or more cloud data centers. In general, a cloud data center, for example the cloud data center 1204a shown in FIG. 12, refers to the physical arrangement of servers that make up a cloud, for example the cloud 1202 shown in FIG. 12, or a particular portion of a cloud. For example, servers can be physically arranged in the cloud datacenter into rooms, groups, rows, and racks. A cloud datacenter has one or more zones, which include one or more rooms of servers. Each room has one or more rows of servers, and each row includes one or more racks. Each rack includes one or more individual server nodes. Servers in zones, rooms, racks, and/or rows may be arranged into groups based on physical infrastructure requirements of the datacenter facility, which include power, energy, thermal, heat, and/or other requirements. In an embodiment, the server nodes are similar to the computer system described in FIG. 13. The data center 1204a has many computing systems distributed through many racks.

The cloud 1202 includes cloud data centers 1204a, 1204b, and 1204c along with the network and networking resources (for example, networking equipment, nodes, routers, switches, and networking cables) that interconnect the cloud data centers 1204a, 1204c, and 1204c and help facilitate the computing systems' 1206a-1206f access to cloud computing services. In an embodiment, the network represents any combination of one or more local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In some embodiments, the network represents one or more interconnected internetworks, such as the public Internet.

The computing systems 1206a-1206f or cloud computing services consumers are connected to the cloud 1202 through network links and network adapters. In an embodiment, the computing systems 1206a-1206f are implemented as various computing devices, for example servers, desktops, laptops, tablet, smartphones, IoT devices, autonomous vehicles (including, cars, drones, shuttles, trains, buses, etc.) and consumer electronics. The computing systems 1206a-1206f may also be implemented in, or as a part of, other systems.

Figure 13:
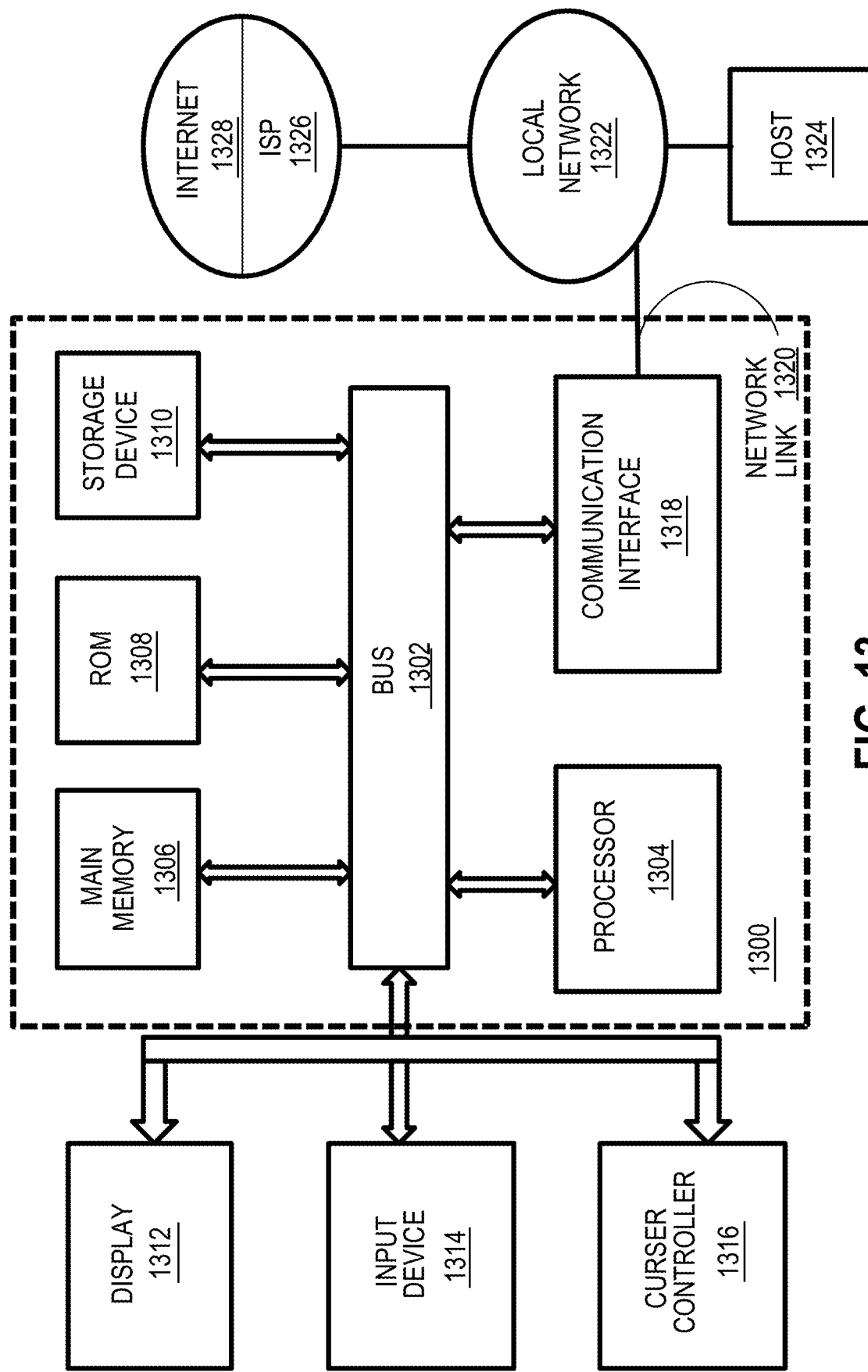
FIG. 13 illustrates an example of a computer system.

FIG. 13 illustrates an example of a computer system 1300. In an embodiment, the computer system 1300 is a special purpose computing device. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, network devices or any other device that incorporates hard-wired and/or program logic to implement the techniques.

The computer system 1300 may include a bus 1302 or other communication mechanism for communicating information, and a hardware processor 1304 coupled with a bus 1302 for processing information. The hardware processor 1304 may be, for example, a general-purpose microprocessor.

The computer system 1300 also includes a main memory 1306, such as a random-access memory (RAM) or other dynamic storage device, coupled to the bus 1302 for storing information and instructions to be executed by processor 1304. The main memory 1306 also may be used for storing temporary variables or other intermediate information during execution of instructions to be executed by the processor 1304. Such instructions, when stored in non-transitory storage media accessible to the processor 1304, render the computer system 1300 into a special-purpose machine that is customized to perform the operations specified in the instructions.

In an embodiment, the computer system 1300 further includes a read only memory (ROM) 1308 or other static storage device coupled to the bus 1302 for storing static information and instructions for the processor 1304. A storage device 1310, such as a magnetic disk, optical disk, or solid-state drive is provided and coupled to the bus 1302 for storing information and instructions.

The computer system 1300 may be coupled via the bus 1302 to a display 1312, such as a cathode ray tube (CRT), a liquid crystal display (LCD), plasma display, light emitting diode (LED) display, or an organic light emitting diode (OLED) display for displaying information to a computer user. An input device 1314, including alphanumeric and other keys, is coupled to bus 1302 for communicating information and command selections to the processor 1304. Another type of user input device is a cursor controller 1316, such as a mouse, a trackball, a touch-enabled display, or cursor direction keys for communicating direction information and command selections to the processor 1304 and for controlling cursor movement on the display 1312. This input device typically has two degrees of freedom in two axes, a first axis (e.g., x-axis) and a second axis (e.g., y-axis), that allows the device to specify positions in a plane.

According to one embodiment, the techniques herein are performed by the computer system 1300 in response to the processor 1304 executing one or more sequences of one or more instructions contained in the main memory 1306. Such instructions may be read into the main memory 1306 from another storage medium, such as the storage device 1310. Execution of the sequences of instructions contained in the main memory 1306 causes the processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as the storage device 1310. Volatile media includes dynamic memory, such as the main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that comprise the bus 1302. Transmission media can also take the form of acoustic or light waves, such as those generated during radio wave and infrared data communications.

Various forms of media may be involved in carrying one or more sequences of one or more instructions to the processor 1304 for execution. For example, the instructions may initially be carried on a magnetic disk or solid-state drive of a remote computer. The remote computer can load the instructions into its dynamic memory and send the instructions over a telephone line using a modem. A modem local to the computer system 1300 can receive the data on the telephone line and use an infrared transmitter to convert the data to an infrared signal. An infrared detector can receive the data carried in the infrared signal and appropriate circuitry can place the data on the bus 1302. The bus 1302 carries the data to the main memory 1306, from which processor 1304 retrieves and executes the instructions. The instructions received by the main memory 1306 may optionally be stored on the storage device 1310 either before or after execution by processor 1304.

The computer system 1300 also includes a communication interface 1318 coupled to the bus 1302. The communication interface 1318 provides a two-way data communication coupling to a network link 1320 that is connected to a local network 1322. For example, the communication interface 1318 may be an integrated service digital network (ISDN) card, cable modem, satellite modem, or a modem to provide a data communication connection to a corresponding type of telephone line. As another example, the communication interface 1318 may be a local area network (LAN) card to provide a data communication connection to a compatible LAN. Wireless links may also be implemented. In any such embodiment, the communication interface 1318 sends and receives electrical, electromagnetic or optical signals that carry digital data streams representing various types of information.

The network link 1320 typically provides data communication through one or more networks to other data devices. For example, the network link 1320 may provide a connection through the local network 1322 to a host computer 1324 or to a cloud data center or equipment operated by an Internet Service Provider (ISP) 1326. The ISP 1326 in turn provides data communication services through the worldwide packet data communication network now commonly referred to as the "Internet" 1328. The local network 1322 and Internet 1328 both use electrical, electromagnetic or optical signals that carry digital data streams. The signals through the various networks and the signals on the network link 1320 and through the communication interface 1318, which carry the digital data to and from the computer system 1300, are example forms of transmission media. In an embodiment, the network 1320 may contain or may be a part of the cloud 1202 described above.

The computer system 1300 can send messages and receive data, including program code, through the network(s), the network link 1320, and the communication interface 1318. In an embodiment, the computer system 1300 may receive code for processing. The received code may be executed by the processor 1304 as it is received, and/or stored in storage device 1310, or other non-volatile storage for later execution.

Although the descriptions in this document have described embodiments wherein the tele-operator is a person, tele-operator functions can be performed partially or fully automatically.

Other embodiments are also within the scope of the claims.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing specification or following claims, what follows this phrase can be an additional step or entity, or a sub-step/sub-entity of a previously-recited step or entity.

The invention claimed is:

1. An apparatus comprising:
   a processor configured to:
      process data to learn a pattern of known risks corresponding to driving a vehicle comprising an autonomous driving capability, wherein learning the pattern of known risks comprises:
         inferring, using a learning algorithm, one or more of (i) regions satisfying criteria indicative of elevated probability of accidents, (ii) time periods corresponding to the elevated probability of accidents, (iii) road configurations, or (iv) a distribution of risks within an region or within a time period, and
         determining the pattern of known risks based on the inferences using the learning algorithm;
      identify, using the pattern of known risks, a risk during a particular instance of driving the vehicle;
      modify the autonomous driving capability in response to the identified risk;
      update operation of the vehicle during the particular instance of driving the vehicle based on modifying the autonomous driving capability; and
      prepare a report of a risk, wherein preparing the report comprises:
         extracting and aggregating, from sensor signals, information associated with the risk,
         evaluating, using the information associated with the risk, one or more of overlapping geographic zones, overlapping time periods, or report frequencies,
         generating the report based on the evaluating, and
         sending the report to a remote entity; and
   an alarm configured to issue an alert of the identified risk.

2. The apparatus of claim 1, wherein identifying the risk comprises detecting or predicting the risk.

3. The apparatus of claim 1, wherein the data comprises at least one of sensor signals, or known or predicted risks.

4. The apparatus of claim 3, wherein identifying the risk comprises at least one of:
   analyzing the sensor signals to determine a position of an object,
   analyzing the sensor signals to evaluate a speed of an object,
   analyzing the sensor signals to evaluate speed profiles of two or more objects over time,
   analyzing the sensor signals to identify a boundary of an object,
   analyzing the sensor signals to identify overlapping boundaries of two or more objects, or
   analyzing the sensor signals to determine a concentration of a chemical.

5. The apparatus of claim 3, wherein identifying the risk comprises analyzing the sensor signals to segment one or more objects in an image or a video.

6. The apparatus of claim 5, further comprising:
identifying an object in a driving environment; and
in response to identifying the object in the driving environment:
  determining a boundary of the object, and
  tracking the object by following the boundary.

7. The apparatus of claim 1, wherein identifying the risk comprises assessing a threat.

8. The apparatus of claim 1, wherein identifying the risk comprises evaluating a driving behavior of at least one of the vehicle or another vehicle.

9. The apparatus of claim 8, wherein evaluating a driving behavior comprises evaluating at least one of a speed, a heading, a trajectory, or a vehicular operation.

10. The apparatus of claim 1, wherein updating the operation of the vehicle comprises executing at least one of a lane change by a motion planning system of the vehicle, or a trajectory change by the motion planning system of the vehicle.

11. The apparatus of claim 1, wherein the processor is configured to treat analyzed sensor signals as prior information to a perception system of the vehicle in response to the risk.

12. The apparatus of claim 1, wherein the processor is configured to invoke intervention on an operation of the vehicle from a remote operator in response to the risk.

13. The apparatus of claim 1, wherein updating the operation of the vehicle comprises at least one of:
  generating and inserting new machine instructions into existing machine instructions of an operation of the vehicle, or
  generating an input to an operation of the vehicle.

14. The apparatus of claim 1, wherein preparing a report of a risk comprises one of:
  recording an environment of the risk,
  stitching images or videos to form a view of the risk,
  removing private information associated with the risk,
  providing a graphical user interface to allow a user to provide information associated with the risk, or
  integrating two or more reports associated with the risk.

15. The apparatus of claim 1, wherein the processor is configured to receive the report of the risk from a remote data source.

16. The apparatus of claim 1, wherein the processor is configured to assess a risk factor of the vehicle.

17. The apparatus of claim 16, wherein assessing the risk factor comprises one of: determining a risk associated with passing through a risky region, determining a risk associated with a driving distance or a driving time period, determining a risk associated with an aging component of the vehicle, determining a risk associated with an inactive autonomous driving capability, determining a risk based on a profile of a user of the vehicle, determining a risk based on social network information of a user of the vehicle, determining a risk associated with a driving behavior, or determining a risk associated with following traffic rules.

18. The apparatus of claim 1, wherein determining the pattern of known risks based on the inferences using the learning algorithm comprises using a probabilistic model to determine risks corresponding to one or more of the regions, the time periods, or the road configurations.

19. The apparatus of claim 1, wherein determining the pattern of known risks based on the inferences using the learning algorithm comprises using historical information about driving properties of vehicles that have previously traveled along similar trajectories at similar times.

20. A method comprising:
processing data to learn a pattern of known risks corresponding to driving a vehicle comprising an autonomous driving capability, wherein learning the pattern of known risks comprises:
  inferring, using a learning algorithm, one or more of (i) regions satisfying criteria indicative of elevated probability of accidents, (ii) time periods corresponding to elevated probability of accidents, (iii) road configurations, or (iv) a distribution of risks within an region or within a time period, and
  determining the pattern of known risks based on the inferences using the learning algorithm;
receiving sensor signals using the vehicle during a particular instance of driving the vehicle;
identifying, using the pattern of known risks, a risk associated with operating the vehicle based on the sensor signals during a particular instance of driving the vehicle;
modifying the autonomous driving capability in response to the identified risk;
updating the operation of the vehicle during the particular instance of driving the vehicle based on modifying the autonomous driving capability; and
preparing a report of a risk, wherein preparing the report comprises:
  extracting and aggregating, from sensor signals, information associated with the risk,
  evaluating, using the information associated with the risk, one or more of overlapping geographic zones, overlapping time periods, or report frequencies,
  generating the report based on the evaluating, and
  sending the report to a remote entity.

21. A vehicle having autonomous driving capabilities, the vehicle comprising:
steering, acceleration, and deceleration devices that respond to control signals from a driving control system to drive the vehicle autonomously on a road network;
a monitoring element on the vehicle that:
  processes data to learn a pattern of known risks corresponding to driving the vehicle, wherein learning the pattern of known risks comprises:
    inferring, using a learning algorithm, one or more of (i) regions satisfying criteria indicative of elevated probability of accidents, (ii) time periods corresponding to elevated probability of accidents, (iii) road configurations, or (iv) a distribution of risks within an region or within a time period, and
    determining the pattern of known risks based on the inferences using the learning algorithm,
  receives sensor signals during a particular instance of driving the vehicle; and
  identifies, using the pattern of known risks, a risk associated with operating the vehicle based on the sensor signals during a particular instance of driving the vehicle; and
a controller that responds to the risk by configuring the driving control system to:
modify the autonomous driving capability in response to the identified risk;
based on modifying the autonomous capability, update an operation of the vehicle during the particular instance of driving the vehicle to maneuver the vehicle to a goal location; and
prepare a report of a risk, wherein preparing the report comprises:

extracting and aggregating, from sensor signals, information associated with the risk, evaluating, using the information associated with the risk, one or more of overlapping geographic zones, overlapping time periods, or report frequencies, generating the report based on the evaluating, and sending the report to a remote entity.

* * * * *

UNITED STATES PATENT AND TRADEMARK OFFICE
CERTIFICATE OF CORRECTION

PATENT NO. : 11,008,000 B2
APPLICATION NO. : 16/013459
DATED : May 18, 2021
INVENTOR(S) : Hsun-Hsien Chang et al.

It is certified that error appears in the above-identified patent and that said Letters Patent is hereby corrected as shown below:

In the Claims

Column 24, Line 51, in Claim 21, delete "algorithm," and insert -- algorithm; --.

Signed and Sealed this
Fourth Day of October, 2022

Katherine Kelly Vidal
*Director of the United States Patent and Trademark Office*